(12) United States Patent
Yagi et al.

(10) Patent No.: US 7,603,507 B2
(45) Date of Patent: Oct. 13, 2009

(54) STORAGE SYSTEM AND METHOD OF STORAGE SYSTEM PATH CONTROL

(75) Inventors: Shuichi Yagi, Matsuda (JP); Dai Taninaka, Odawara (JP); Takao Mashima, Fujisawa (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 12/153,302

(22) Filed: May 16, 2008

(65) Prior Publication Data

US 2008/0228987 A1    Sep. 18, 2008

Related U.S. Application Data

(63) Continuation of application No. 11/070,182, filed on Mar. 3, 2005, now abandoned.

(30) Foreign Application Priority Data

Dec. 24, 2004   (JP)   .............................. 2004-372713

(51) Int. Cl.
    *G06F 13/00* (2006.01)
    *G06F 3/00* (2006.01)
(52) U.S. Cl. .................... 710/316; 710/38; 710/36; 714/43; 709/239
(58) Field of Classification Search .................. 710/36, 710/38, 316; 714/43; 709/239
    See application file for complete search history.

(56) References Cited

U.S. PATENT DOCUMENTS 5,848,072 A    12/1998   Prill et al.    .................... 370/471
6,173,346 B1   1/2001    Wallach et al.  ............... 710/302
6,237,008 B1   5/2001    Beal et al.     .................... 707/204
6,457,109 B1   9/2002    Milillo et al.  ............... 711/162
6,718,404 B2   4/2004    Reuter et al.   ................... 710/20
6,832,299 B2   12/2004   Shimada et al.  ............. 711/148
6,857,026 B1 * 2/2005    Cain            ......................... 709/239
6,948,038 B2   9/2005    Berkowitz et al. .......... 711/162
7,117,331 B2   10/2006   Uchiumi et al.  ............. 711/164
2002/0133511 A1  9/2002  Hostetter et al. ............ 707/204
2003/0079019 A1  4/2003  Lolayekar et al. ........... 709/226
2003/0233382 A1  12/2003 Gemba et al.    ............... 707/201
2004/0205262 A1  10/2004 Ikeno           ........................... 710/15

FOREIGN PATENT DOCUMENTS

EP    1357476 A2    10/2003
WO    9709676       3/1997

* cited by examiner

*Primary Examiner*—Henry W. H. Tsai
*Assistant Examiner*—Steven G Snyder
(74) *Attorney, Agent, or Firm*—Brundidge & Stanger, P.C.

(57) ABSTRACT

The present invention uses memory resources effectively and connects each storage device by a plurality of paths in a switchable manner, thus improving reliability and ease of use, by virtualizing external memory resources as internal memory resources. External storage 2 is connected to the main storage 1, and the actual volume 2A is mapped onto the virtual volume 1A. A plurality of paths is connected between the storage 1 and 2. When a failure occurs in a path in use (S3), the path having the next highest priority is selected (S4), and processing is continued using this path (S5).

15 Claims, 22 Drawing Sheets

FIG. 5

EXTERNAL DEVICE INFORMATION TABLE — T1

| VDEV NUMBER | VALID PATH | CHASSIS INFORMATION | DEVICE IDENTIFICATION INFORMATION | CAPACITY (KB) | DEVICE TYPE | EXTERNAL CONNECTION PATH INFORMATION TABLE ||||||
|---|---|---|---|---|---|---|---|---|---|---|---|
| | | | | | | PATH # | EXTERNAL PORT # | WWN | EXTERNAL LUN # | STATE | PRIORITY |
| 1 | 11111111 | VENDOR NAME PRODUCT NAME SERIAL # | EXTERNAL LDEV1 | C1 | DISK | P1 | EP1 | WWN1 | 1 | NORMAL | 0 |
| | | | | | | P2 | EP2 | WWN2 | 2 | NORMAL | 1 |
| | | | | | | P3 | EP3 | WWN3 | 3 | NORMAL | 2 |
| | | | | | | P4 | EP4 | WWN4 | 4 | DISCONNECT | 5 |
| | | | | | | P5 | EP5 | WWN5 | 5 | DISCONNECT | 6 |
| | | | | | | P6 | EP6 | WWN6 | 6 | DISCONNECT | 7 |
| | | | | | | P7 | EP7 | WWN7 | 7 | NORMAL | 3 |
| | | | | | | P8 | EP8 | WWN8 | 8 | NORMAL | 4 |
| 2 | 11011111 | VENDOR NAME PRODUCT NAME SERIAL # | EXTERNAL LDEV2 | C2 | DISK | | | | | | |
| ... | ... | ... | ... | ... | ... | | | | | | |

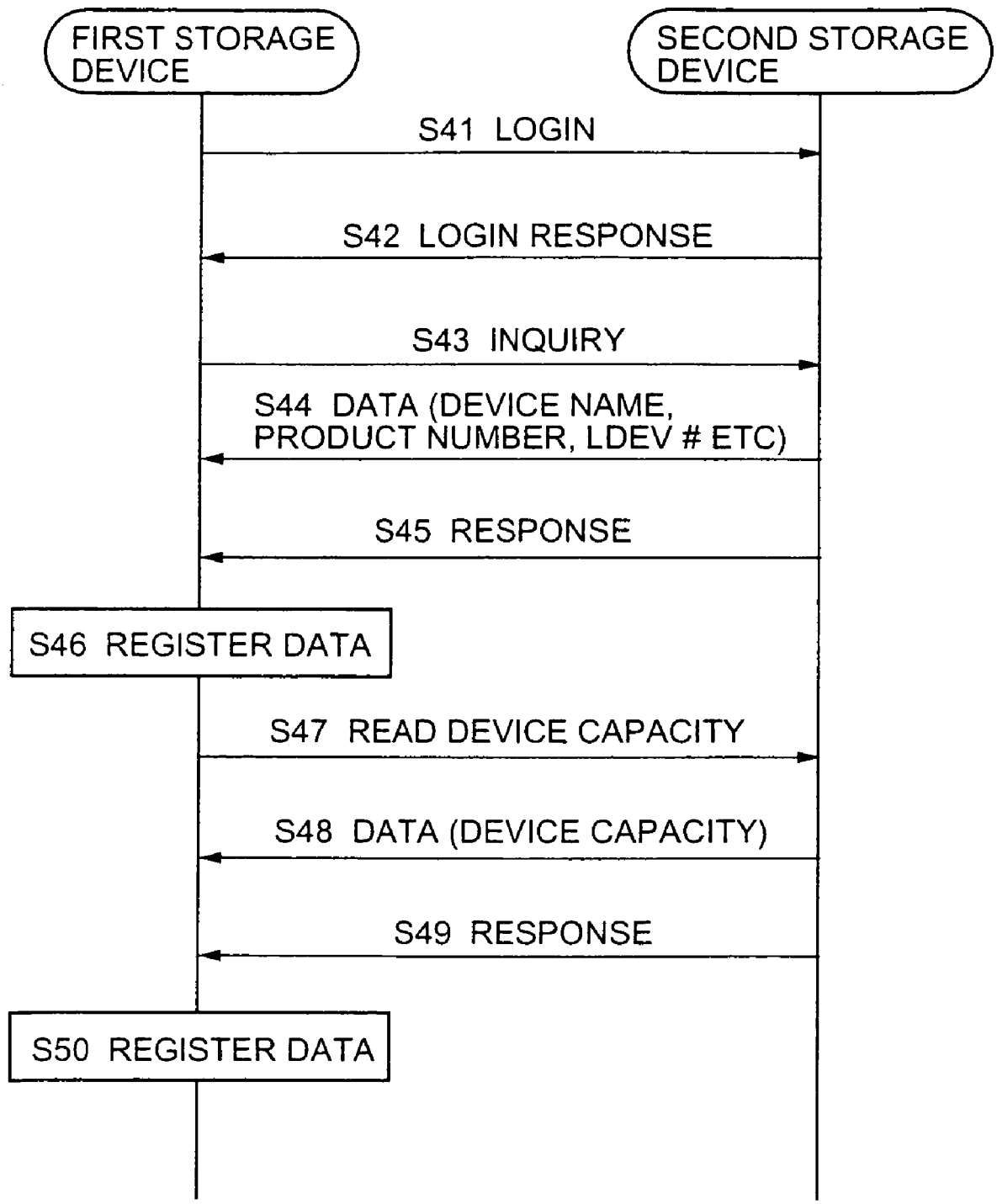

FIG. 13

WWN INFORMATION MANAGEMENT TABLE T3

| CHASSIS ID | # | WWN | ALTERNATE PATH MODE |
|---|---|---|---|
| SS#2 | 1 | WWN1 | SINGLE PATH |
| | 2 | WWN2 | SINGLE PATH |
| | 3 | WWN3 | SINGLE PATH |
| | ... | ... | ... |
| SS#3 | 1 | WWN1 | MULTI-PATH |
| | 2 | WWN2 | MULTI-PATH |
| | 3 | WWN3 | MULTI-PATH |
| | ... | ... | ... |
| ... | ... | ... | ... |

STORAGE SYSTEM AND METHOD OF STORAGE SYSTEM PATH CONTROL

CROSS-REFERENCE TO RELATED APPLICATIONS

The present application is a continuation of application Ser. No. 11/070,182, filed Mar. 3, 2005 now abandoned; which relates to and claims priority from Japanese Patent Application No. 2004-372713 filed on Dec. 24, 2004, the entire disclosure of which is incorporated herein by reference.

BACKGROUND OF THE INVENTION

The present invention relates to a storage system and a method of storage system path control.

For example, in order to handle large volumes of various types of data in government, public offices, local authorities, industry, and educational institutions and the like, comparatively large-scale storage systems are used in management of data. These storage systems are, for example, comprised of disk array devices and the like. Since a disk array device is comprised of a plurality of storage devices arranged in an array, for example, a storage area based on a RAID (Redundant Array of Independent Disks) is provided.

At least one logical volume (logical unit) is formed in the physical storage area provided by the group of storage devices, and this logical volume is provided to the host computer (that is to say, the database program running on the host computer). By sending the prescribed command, the host computer (hereafter referred to as the 'host') can write data to, and read data from, the logical volume.

Data to be managed increases daily in association with development of the information society. Storage devices of greater performance and capacity are therefore required, and storage systems employing a plurality of storage devices are sometimes configured in response to these market demands.

When configuring storage systems employing a plurality of storage devices, a method whereby existing old types of storage device are replaced by new types of storage device is known (see Published Japanese Translation No. H10-508967 of PCT International Publication). In the conventional technology disclosed in this document, a time zone of low load is determined, and data on the existing storage device is migrated to the newly installed storage device.

The technology disclosed in the afore-mentioned document simply replaces the existing storage device with a newly installed storage device. In this document, one storage device uses the storage resources of another storage device in an autonomous manner, and thus the effective use of overall storage resources of the storage system is not considered.

As disclosed in the afore-mentioned document, when completely migrating data from an old type of storage device to a new type of storage device, the functions and performance of the new type of storage device may be used. However, when data has been completely transferred, the old type of storage device is wasted, and the old type of storage device cannot be used effectively.

SUMMARY OF THE INVENTION

With the foregoing in view, it is an object of the present invention to provide a storage system and a method of storage system path control to link together a plurality of storage devices to enable effective use of storage resources, and improved ease of use and reliability. A further object of the present invention is to provide a storage system and a method of storage system path control to connect a plurality of storage devices via a plurality of communications paths and enable switching of the communications path in response to the state of use of the storage system. Further purposes of the present invention will be apparent from the embodiments disclosed below.

The storage system to resolve these problems in accordance with the present invention has a first storage device having a virtual volume used by the host, a second storage device having an actual volume associated with the virtual volume and connected to the first storage device via a plurality of communications paths, a mapping management section connecting the virtual volume and actual volume by a plurality of communications paths and mapping the actual volume as the data storage destination volume of the virtual volume, and a control section processing access requests from the host to the virtual volume based on mapping information between the virtual volume and actual volume managed by this mapping management section. The control section selects at least one of the communications paths for processing of access requests.

Here, the first storage device may, for example, be configured as a device having onboard storage resources such as a disk array subsystem. However, the first storage device is not limited to this configuration, and, for example, can also be configured as an intelligent fiber channel switch and the like. The first storage device may be configured as a device without physical storage resources for provision of a storage service to the host. The first storage device need have no physical volume storing actual data, and need only be able to establish a virtual volume.

The virtual volume and actual volume are connected via a plurality of communications paths, the actual volume being employed as the data storage destination volume of the virtual volume. In other words, when the host writes data to the virtual volume, this write data is sent to the second storage device and written to the actual volume. Furthermore, when the host reads data from the virtual volume, this read data is read from the actual volume of the second storage device, and provided to the host. The first storage device can therefore comprise a memory for temporary or permanent storage of data. When the read data requested from the host is stored in this memory, the first storage device does not necessarily require read data to be acquired from the second storage device.

In an embodiment of the present invention, the priority of each communications path is preset. Based on priority, the control section selects at least one of the usable communications paths as usable. For example, of the plurality of usable communications paths, the control section uses the communications path with the highest priority to access the actual volume.

In an embodiment of the present invention, the control section also has a failure detector to detect whether or not a failure has occurred in any of the communications paths. When the failure detector detects occurrence of a failure in a communications path in use, at least one of the usable communications paths is selected and used. In other words, when any form of failure is detected in a communications path in use, the control section can select a communications path having a high priority from the plurality of normal communications paths. However, selection is not limited to this, and any one of the normal communications paths, or a plurality of communications paths, can be selected as desired. Thus, when a failure occurs in communications path in use and the communications path is no longer usable, the control section can use another communications path to access the actual volume, and processing of access requests from the host is not interrupted. Furthermore, recovery from a failure can be conducted while processing access requests from the host.

In an embodiment of the present invention, mapping information managed by the mapping management section is associated with at least virtual volume identification information for identification of the virtual volume, actual volume identification information for identification of the actual volume, information on each path to access the actual volume from the virtual volume using the communications paths, state information to indicate whether each communications path is in a usable or unusable state, and priority information indicating the priority of each communications path.

Information for each path may be formed by associating first port information for identification of each of the plurality of first ports of the first storage device, second port information for identification of each of the plurality of second ports of the second storage device, and logical unit numbers (LUN) associated with each of the second ports.

A management device connected to the first storage device can be further provided, and configured to allow update of all or part of the mapping information.

Furthermore, the management device may be configured so that all or part of the mapping information may be updated for each of at least one communications path connected to a preset prescribed connection point. Here, the prescribed connection point can be, for example, a node included within a communications path as in a communications port and the like.

For example, this management device may be configured so that all or part of the mapping information may be updated for each of at least one communications path connected to a first port, a second port, or an actual volume. In other words, the communications path configuration may be managed in units of first ports, second ports, or actual volumes. Here, a first port unit implies, for example, that mapping information may be updated for all or part of the communications paths connected to each first port. Similarly, a second port unit implies, for example, that mapping information may be updated for all or some of the communications paths connected to each second port. Similarly, an actual volume unit implies, for example, that mapping information may be updated for all or some of the communications paths connected to the actual volume. If a given group of actual volumes and virtual volumes is considered, one end of each communications path is connected to an actual volume, and the other end of each communications path is connected to a virtual volume. The configuration wherein communications path configuration may be managed by actual volume unit is therefore equivalent to a configuration wherein communications path configuration may be managed by virtual volume.

Thus, by establishing a configuration wherein the configuration of each communications path may be managed with the prescribed unit, efficiency of maintenance work may be improved. For example, when a failure occurs, or with work such as planned replacement of components, it is possible to disconnect (logical disconnect) only the communications path on which the failure has occurred, or replacement is planned. Except in cases such as all communications paths being unusable, processing of access requests from the host is not interrupted.

The management device can update state information including at least mapping information, and when halting the first storage device, the second storage device, or both, in a planned manner, the state of the prescribed communications paths relating to this planned halt can be changed from usable to unusable, and when the planned halt is complete, the state of the prescribed communications paths may be changed again to usable.

The control section is further comprised of a failure detector to detect whether or not a failure has occurred in each communications path. When a failure is detected in any of the communications paths, the failure detector may be configured to ignore a failure occurring in a communications path in which the state is set to unusable. Thus, for example, when conducting maintenance work on the second storage device, detected failures can be ignored by presetting the state of the each communications path subject to maintenance work to unusable. A situation wherein failures detected due to planned maintenance work on the second storage device are notified to an external maintenance management center can therefore be prevented before the event.

Even when the management device changes the state of the communications path to unusable, the priority can be fixed.

In an embodiment of the present invention, the control section can also process access requests while switching each communications path in sequence. In other words, the control section can access the actual volume using a different communications path for each access request. Thus, processing is possible at a higher speed than when access requests are processed using a single communications path.

The control section has the first mode for processing access requests using one of the communications paths, and the second mode for processing access requests while switching between communications paths in sequence.

When a third storage device having another actual volume associated with another virtual volume of the first storage device, and connected to the first storage device via a plurality of other communications paths, the control section can also apply the first mode or second mode in units of storage devices. In other words, for example, the control section can access the actual volume of the second storage device in the first mode, and can access the actual volume of the third storage device in the second mode. For example, as in the case of use of the second mode with a virtual volume for which high-speed processing is requested, the access mode can therefore be changed in response the form of use of the virtual volume.

A storage system path control method according to a different point of view of the present invention includes a first step wherein an virtual volume of the first storage device and an actual volume of the second storage device are connected via a plurality of communications paths, and mapping information indicating the association between the virtual volume and the actual volume is managed, a second step wherein access requests from the host to the virtual volume are processed based on mapping information and using one of the communications paths, a third step wherein the occurrence or not of a failure in the communications paths is detected, a fourth step wherein at least one usable communications path is selected, and a fifth step wherein access requests from the host are processed using the selected communications path.

In the fourth step, of the usable communications paths, one communications path for which the highest priority is set can also be selected.

A sixth step wherein all or part of the mapping information can be updated for each of the one or more communications paths connected to the preset prescribed connection point can also be added.

The means, functions, and all or some of the steps, may be configured as a computer program executed by a computer system in some cases. When all or part of the configuration of the present invention is configured from a computer program, this computer program can be, for example, retained on various types of storage media and distributed and the like, and can also be sent via communications networks.

BRIEF DESCRIPTION OF THE DRAWINGS

FIG. 5 shows an example of the configuration of the external device information table;

FIG. 9 is a flowchart showing the processing to acquire second storage device information;

FIG. 13 shows the WWN information management table according to the second embodiment;

DESCRIPTION OF THE PREFERRED EMBODIMENTS

Figure 1:
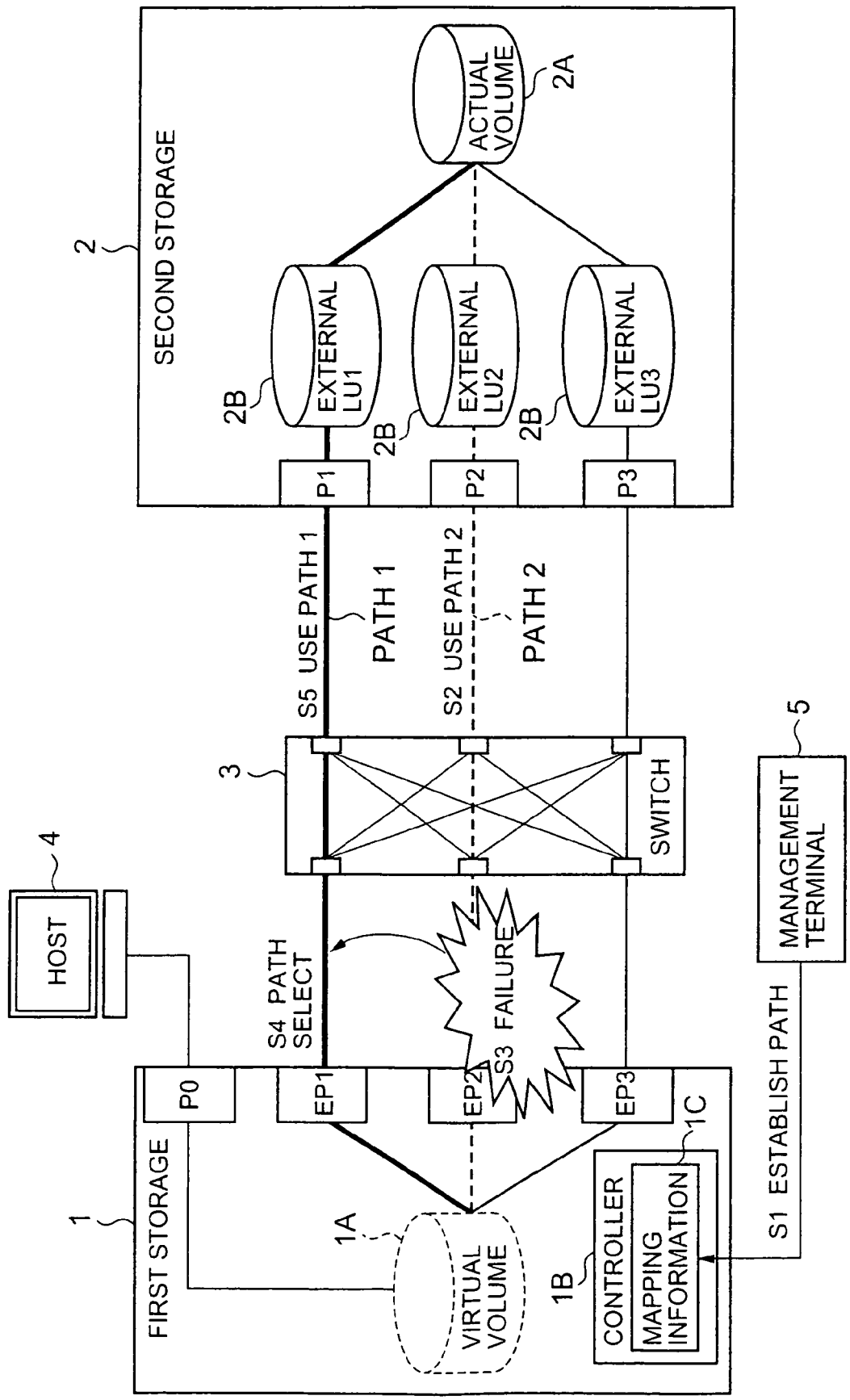
FIG. 1 is a block diagram showing the overall configuration of the storage system according to an implementation of the present invention.

FIG. 1 shows the overall configuration of an embodiment of the present invention. In the present embodiment, by mapping a storage device existing externally to its own virtual intermediate storage device, the external storage device is handled as if it were its own internal volume, and is provided to the host.

The storage system of the present embodiment can be, for example, comprised of a first storage device 1, a second storage device 2, a switch 3, a host 4, and a management terminal 5 as a management device.

The first storage device 1 is, for example, configured as a disk array device. The first storage device 1 has a plurality of communications ports (hereafter referred to as 'ports') P0, and EP1 through EP3. The port P0 is used for communications with the host 4. The ports EP1 through EP3 are external connection ports used for communication with the second storage device 2. These ports P0 and EP1 through EP3 are connected to the virtual volume 1A.

The storage system can be, for example, configured as a storage system wherein data communication is conducted based on the Fiber Channel Protocol as with Storage Area Networks (SAN) and the like. The management terminal 5 and the first storage device 1 may, for example, be connected to a network for data communications based on TCP/IP (Transmission Control Protocol/Internet Protocol) as with a LAN (Local Area Network) or WAN (Wide Area Network). The afore-mentioned is provided as an example, and the present invention is not limited to any particular type of protocol.

The first storage device 1 can be comprised of a virtual volume 1A and a control section 1B. The virtual volume 1A exists only virtually, and the entity wherein data is actually stored exists on the second storage device 2.

In other words, the virtual volume 1A is constructed by mapping the actual volume 2A of the second storage device 2 onto a prescribed storage layer of the first storage device 1. This virtual volume 1A is connected to the actual volume 2A of the second storage device 2 via the external connection ports EP1 through EP3. Furthermore, the virtual volume 1A is connected to port 4 via port P0.

The control section 1B controls overall operation of the first storage device 1. The control section 1B holds the mapping information 1C, and controls data input and output and the like based on this mapping information 1C.

The mapping information 1C can include, for example, virtual volume identification information for identification of the virtual volume 1A, actual volume identification information for identification of the actual volume 2A, information on each path to access the actual volume 2A from the virtual volume 1A using each communications path (hereafter referred to as 'paths'), state information to indicate whether or not each communications path is in a usable condition, and priority information indicating the priority state of each communications path.

The mapping information 1C may be updated by an instruction from the management terminal 5. In other words, the management terminal 5 can define the mapping relationship between the virtual volume 1A and actual volume 2A.

When an access request for the virtual volume 1A is received from the host 4 via the port P0, the control section 1B accesses the actual volume 2A of the second storage device 2 based on the mapping information 1C.

For example, in the case of a write request, the control section 1B transfers write data received from the host 4 to the second storage device 2 via the prescribed port of ports EP1 through EP3 and stores it on the actual volume 2A. Furthermore, for example, in the case of a read request, the control section 1B accesses the second storage device 2 via the prescribed port of ports EP1 through EP3, and reads the data requested from the host 4 from the actual volume 2A. It therefore appears that the virtual volume 1A is accessed directly from the host 4, however, the actual destination volume for data storage is the actual volume 2A of the second storage device 2.

As with the first storage device 1, the second storage device 2 is comprised of, for example, a disk array device. The second storage device 2 is connected to the first storage device 1 via a plurality of paths.

The second storage device 2 can be comprised of, for example, an actual volume 2A, a plurality of external LU2B units each associated with the actual volume 2A, and ports P1 through P3 each associated with each of these external LU2B units. Here, since the host 4 storage service is provided by the first storage device 1, the first storage device 1 forms main storage. The second storage device 2 is external storage external to the first storage device 1. Here, the LU within the second storage device 2 is therefore referred to as an 'external LU' from the point of view of the first storage device 1.

The actual volume 2A is provided based on the physical memory device provided within the second storage device 2. As described above, the actual volume 2A is mapped onto the virtual volume 1A of the first storage device 1, and provided as a logical volume entity to the virtual volume 1A.

The paths provided between the first storage device 1 and the second storage device 2 are each connected to the actual volume 2A. In other words, the actual volume 2A may be accessed via any of the ports P1 through P3.

The switch 3 is a relay device connecting the first storage device 1 and the second storage device 2. The switch 3 can be, for example, configured as a fabric type switch. The switch 3 is comprised of a plurality of single-side ports and other-side ports. Each single-side port and each other-side port may be freely connected. In the example shown in the figure, therefore, nine routes can be formed with the switch 3.

Here, three paths have been established to assist in understanding of the invention. The first path connects the port EP1 of the first storage device 1 and the port P1 of the second storage device 2 in a linear manner. This path is shown by the thick line in FIG. 1. The second path connects the port EP2 and the port P2 in a linear manner, and is shown by the dashed line. The third path connects the port EP3 and the port P3 in a linear manner. The single-end side of each path is connected to the virtual volume 1A, and the other-end side is connected to the actual volume 2A. The control section 1B can access the actual volume 2A irrespective of which path is used.

Next, operation of the storage system is described below in outline. Firstly, a user such as the system manager and the like accesses the first storage device 1 via the management terminal 5, and sets up the mapping information 1C (S1). By creating mapping information 1C, the virtual volume 1A is created in the first storage device 1, and the ports P0 and EP1 through EP3 can be allocated to the virtual volume 1A. Furthermore, the actual volume 2A can be mapped onto the virtual volume 1A.

Here, the control section 1B initially uses the second path (EP2-P2) to access the actual volume 2A (S2). When a failure occurs in the second path while in use (S3), the control section 1B detects the occurrence of this failure. Examples of failures are a fault in port EP2 or port P2, and a break in the fiber cable, and the like.

When the control section 1B detects a failure in the second path, it switches from the second path to the first path (EP1-P1) (S4), and thus the access requests from the host 4 are continued using the first path (S5).

Here, since the priority set for the first path is higher than the priority set for the third path (EP3-P3), the first path is selected. If the priority of the third path is higher than that of the first path, the third path is selected.

Thus, according to the present embodiment, the first storage device 1 can incorporate and use the actual volume 2A of the second storage device 2 as its own virtual volume 1A.

According to the present embodiment, the first storage device 1 and the second storage device 2 are connected by a plurality of paths, and any path can be used to access the actual volume 2A. When a failure is detected in a path in use, therefore, another normal path is switched in, and processing of access requests from the host 4 can continue without interruption, and thus resistance to failure and reliability are improved. Fault recovery work can be conducted while the path is switched out and operation continues.

Furthermore, according to the present embodiment, since a plurality of paths can be used, for example, when conducting planned maintenance such as port replacement and the like, maintenance work can be conducted without halting the storage system. Ease of use is therefore improved. The present embodiment is described below in greater detail.

First Embodiment

Figure 2:
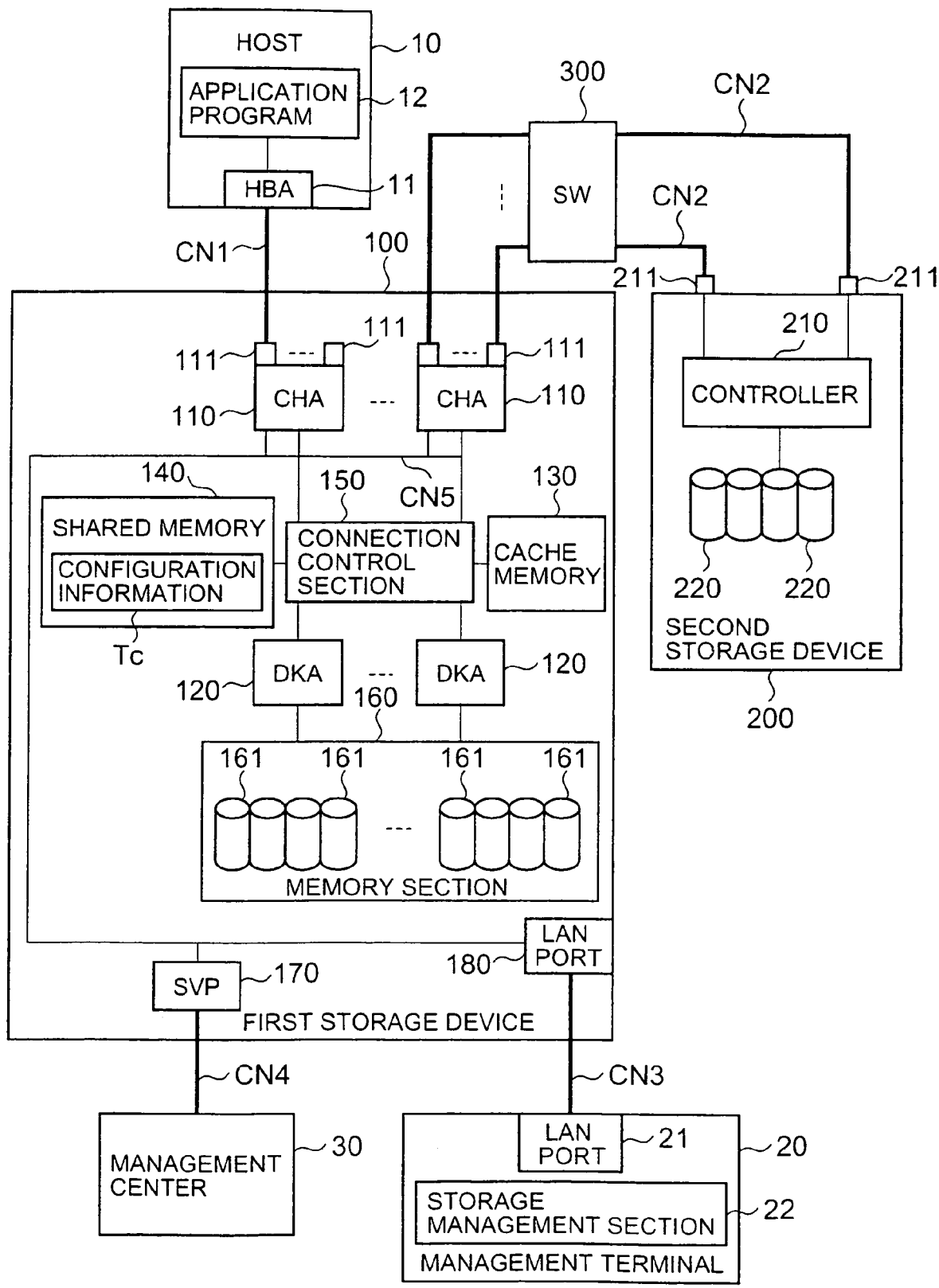
FIG. 2 is a block diagram of the storage system.

FIG. 2 is a block diagram showing the configuration of the primary components of the storage system. As described below, this storage system can be, for example, configured to include a host 10, a management terminal 20, a management center 30, a plurality of storage devices 100 and 200, and a switch 300 connecting storage devices 100 and 200.

The host 10 and first storage device 100 are connected via the communications network CN1. The first storage device 100 and the second storage device 200 are connected via a plurality of communications networks CN2.

The first storage device 100 and the management terminal 20 are connected via the communications network CN3. Furthermore, the first storage device 100 and the management center 30 are connected via the communications network CN4.

The host 10 is a computer device comprising information processing resources such as a CPU (Central Processing Unit) and a memory and the like, and is configured as a personal computer, a work station, or a mainframe computer and the like.

The host 10 is comprised of an HBA (Host Bus Adapter) 11 for accessing the first storage device 100 via the communications network CN1, and for example, an application program 12 such as database software and the like.

The communications network CN1 can be, for example, a LAN (Local Area Network), a SAN (Storage Area Network), the Internet, a dedicated line, or a public line and the like as appropriate. Data communications via a LAN is conducted in accordance with, for example, the TCP/IP protocol. When the host 10 is connected to the first storage device 100 via a LAN, the host 10 specifies the file name and requests input and output of data in units of files.

When the host 10 is connected to the first storage device 100 via a SAN, the host 10 requests input and output of data in blocks being data management units for the memory area provided by a plurality of disk drives in accordance with the Fiber Channel Protocol. When the communications network CN1 is a LAN, the HBA 11 is, for example, a LAN compatible network card. When the communications network CN1 is a SAN, the HBA 11 is, for example, a host bus adapter.

When the host 10 is configured as a mainframe computer, the host 10 sends data in accordance with, communications protocols such as FICON (Fiber Connection (registered trademark)), ESCON (Enterprise System Connection (registered trademark)), ACONARC (Advanced Connection Architecture (registered trademark)), or FIBARC (Fiber Connection Architecture (registered trademark)) and the like.

The management terminal 20 is a computer device for management of storage system configurations and the like, and, for example, is operated by a user such as a system manager and the like. The management terminal 20 is connected to the first storage device 100 via the communications network CN3. The management terminal 20 can be, for example, configured to comprise a LAN port 21 for connection to the communications network CN3, and a storage management section 22. The storage management section 22 is, for example, configured as software, and presents various instructions to the first storage device 100. Control information and tables and the like within the first storage device 100 can be rewritten with these instructions. Furthermore, the management terminal 20 acquires various information from the first storage device 100, and can also display it on the terminal screen.

The management center 30 is connected to the first storage device 100 via the communications network CN4. The management center 30 is a computer device for management of storage system maintenance. The management center 30 receives notification of failures from the first storage device 100, and, for example, communicates this fact to maintenance personnel and the like.

The first storage device 100 is, for example, configured as a disk array subsystem. However, the first storage device 100 is not limited to this configuration, and may also be configured as a high-performance intelligent fiber channel switch.

As described below, the first storage device 100 provides the host 10 with the memory resources of the second storage device 200 as its own logical volume (Logical Unit: labeled as 'LDEV' in figures). The first storage device 100 is main storage in the storage system, and provides a storage service to the host 10. On the other hand, the second storage device 200 is external storage used by the first storage device 100 being main storage.

The first storage device 100 can be generally classified into a controller and memory section 160, the controller comprising, for example, a plurality of channel adapters (hereafter referred to as 'CHA') 110, a plurality of disk adapters (hereafter referred to as 'DKA') 120, a cache memory 130, a shared memory 140, and a connection control section 150. The controller is labeled as 'controller 101' in FIG. 4 described below.

Each CHA 110 conducts data communications with the host 10. Each CHA 110 has a plurality of ports 111 for communication with the host 10. As described below, each port 111 can be, for example, classified as an initiator port, a target port, or an external connection port (External port). An initiator port is a port issuing commands as a host. A target port is a port receiving and processing commands. An external connection port is a type of initiator port, and is used for connection to the second storage device 200.

Each CHA 110 is configured as a microcomputer system comprising a CPU and memory and the like, and interprets and executes various commands received from the host 10. A network address (for example, an IP address, or WWN) is allocated to each CHA 110 for identification, and each CHA 110 may individually behave as NAS (Network Attached Storage). When a plurality of hosts 10 exist, each CHA 110 individually receives and processes requests from each host 10.

Each DKA 120 transfers data to the disk drives 161 of the memory section 160. As with each CHA 110, each DKA 120 is configured as a microcomputer system comprising a CPU and memory and the like. Each DKA 120, for example, writes data received from the host 10 by the CHA 110, and data read from the second storage device 200, to the prescribed address on the prescribed disk drive 161.

Furthermore, each DKA 120 reads data from the prescribed address on the prescribed disk drive 161, and sends it to the host 10 or second storage device 200. When data is input and output to and from a disk drive 161, the logical address of each DKA 120 is converted to a physical address. When the disk drive 161 is managed as a RAID, each DKA 120 accesses data in response to the RAID configuration. For example, each DKA 120 writes the same data to separate disk drive groups (RAID groups), or computes parity and writes data and parity to the disk drive groups.

The cache memory 130 stores data received from the host 10 or the second storage device 200, or stores data read from the disk drives 161. As described below, a virtual intermediate memory device is constructed using the memory space of the cache memory 130.

Various control information used in control of operation of the first storage device 100, and configuration information Tc and the like, is stored in shared memory (also referred to as control memory) 140. This configuration information Tc includes the tables T1 through T3 and the like described below. The management terminal 20 can rewrite all or part of the configuration information Tc in shared memory 140.

One or more of the disk drives 161 may be used as a cache disk. Furthermore, the cache memory 130 and shared memory 140 can also be configured as separate memories, and part of the same memory area can also be used as a cache area, and another memory area used as a control area.

The connection control section 150 mutually connects each CHA 110, each DKA 120, cache memory 130, and shared memory 140. The connection control section 150, can be, for example, configured as a high-speed bus such as an ultra high-speed crossbar switch and the like transmitting data by high-speed switching operation.

The memory section 160 is comprised of a plurality of disk drives 161. A variety of memory devices and equivalent devices, for example, hard disk drives, flexible disk drives, magnetic disk drives, semiconductor memory drives, and optical disk drives and the like, can be used as disk drives 161. Furthermore, different types of disks such as FC (Fiber Channel) disks and SATA (Serial AT Attachment) disks and the like can be mixed in the memory section 160.

As described below, the virtual volume 163V based on the disk drives 220 of the second storage device 200 is formed in the first storage device 100. This virtual volume 163V is provided to the host 10 in a similar manner to the internal volume 163 based on the disk drives 161.

The SVP (service processor) 170 is connected, for example, to each CHA 110, via the internal communications network CN5. The SVP 170 can also access shared memory 140 and the like via one or more CHA 110. The SVP 170 is connected to the management terminal 20 via the LAN port 180. Furthermore, the SVP 170 is also connected to the management center 30 via, for example, a communications network CN4 such as a public telephone line. The SVP 170 may collect various information in the first storage device 100 and output it to the management terminal 20. Furthermore, the SVP 170 can rewrite configuration information Tc stored in shared memory 140, and change the configuration of the first storage device 100, in response to instructions from the management terminal 20.

The second storage device 200 can comprise, for example, a controller 210 and a plurality of disk drives 220. The controller 210 controls overall operation of the second storage device 200. The second storage device 200 is connected to the first storage device 100 via a plurality of ports 211. The second storage device 200 and the first storage device 100 are connected via the communications network CN2. The communications network CN2 may comprise a SAN or LAN and the like.

The second storage device 200 can also be configured similarly to the first storage device 100, and can also have a different configuration to the first storage device 100. The disk drives 220 of the second storage device 200 are handled as internal memory devices of the first storage device 100.

The switch 300 is provided between the first storage device 100 and the second storage device 200. The switch 300 can be, for example, configured as a fiber channel switch. The switch 300 has a plurality of ports, and connection to each port may be freely switched. One of the group of ports of the switch 300 is connected to a plurality of external connection ports of the first storage device 100. The other group of ports of the switch 300 are connected to a plurality of target ports 211 of the second storage device 200. The first storage device 100 and the second storage device 200 can be, for example, connected using up to eight paths.

Figure 3:
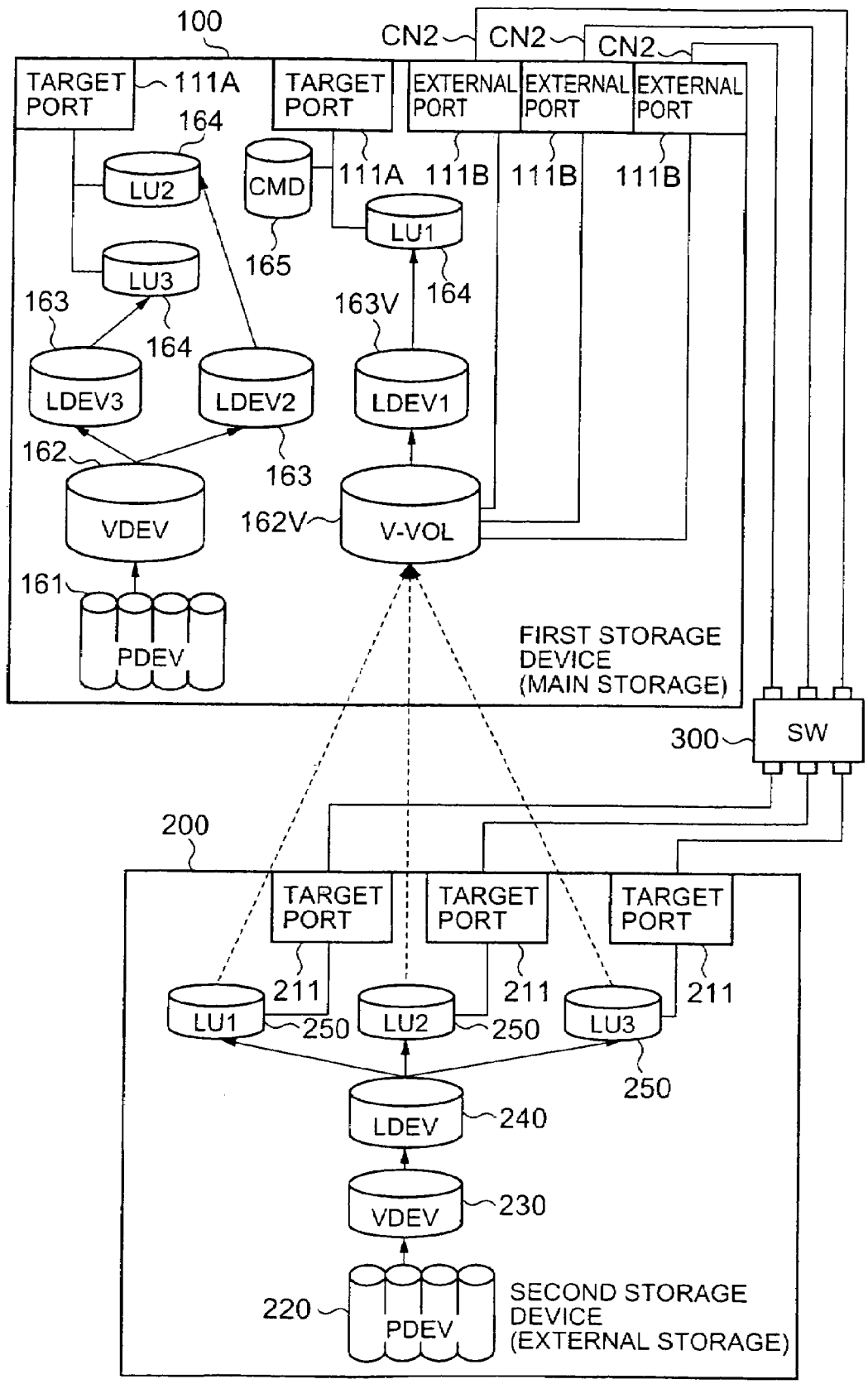
FIG. 3 is schematic diagram describing the storage structure of storage system.

FIG. 3 shows the configuration of the logical memory structure of the first storage device 100 and second storage device 200. The configuration of the first storage device 100 is described first.

The memory structure of the first storage device 100 can be, for example, generally classified into a physical memory layer and a logical memory layer. The physical memory layer is comprised of a PDEV (Physical Device) 161 being a physical disk. The PDEV corresponds to a disk drive.

The logical memory layer can be comprised of a plurality of layers (for example, two types). A logical layer may be comprised of a VDEV (Virtual Device) 162, and a virtual VDEV (hereafter also referred to as 'V-VOL') 162V handled as a VDEV 162. Another logical layer can be comprised of an LDEV (Logical Device) 163.

VDEV 162, is comprised of prescribed numbers of PDEV 161 in groups, for example, four in one assembly (3D+1P), or eight in one assembly (7D+1P), and the like. The memory areas provided by each PDEV 161 belonging to a group are aggregated to form a single RAID memory area. This RAID memory area forms a VDEV 162.

In contrast to the construction of the VDEV 162 on the physical memory area, the V-VOL 162V is a virtual intermediate memory device not directly requiring a physical memory area. The V-VOL 162V is not directly related to the physical memory area, but is a receiver for mapping LU (Logical Units) of the second storage device 200.

At least one LDEV 163 can be provided on VDEV 162 or V-VOL 162V. The LDEV is a logical volume. LDEV 163, can be, for example, configured by dividing VDEV 162 into fixed lengths. In FIG. 3, the LDEV established on V-VOL 162V is labeled '163V'. However, in cases where there is no particular need to distinguish between the two, it is referred to as LDEV 163 irrespective of origin.

When the host 10 is an open system host, the host 10 recognizes LDEV 163 as a single physical disk by mapping LDEV 163 onto LU164. The open system host accesses the desired LDEV 163 by specifying the LUN (Logical Unit Number) and logical block address. In the case of a mainframe system host, LDEV 163 is recognized directly.

LU 164 are devices able to be recognized as SCSI logical units. Each LU 164 may be connected to the host 10 via the target port 111A. Each LU 164 can be associated with at least one LDEV 163. By associating a plurality of LDEV 163 to one LU 164, the LU size can also be virtually expanded.

The CMD (Command Device) 165 is a dedicated LU used to transfer commands and states between the I/O control program running on the host 10 and the first storage device 100 controller (CHA 110, DKA 120 and the like). For example, the host 10 can write commands to CMD 165. The first storage device 100 controller runs processing in response to commands written to CMD 165, and writes the results of this processing to CMD 165 as a state. The host 10 reads and verifies the state written to CMD 165, and writes the processing details to be executed next to CMD 165. Thus, the host 10 can present various instructions to the first storage device 100 via CMD 165.

Commands received from the host 10 can also be processed without storage in CMD 165. Furthermore, the CMD may be created as a virtual device without defining the entity device (LU), and configured to receive and process commands from the host 10. In other words, for example, CHA 110 writes commands received from the host 10 to shared memory 140, and CHA 110 or DKA 120 process commands stored in this shared memory 140. The results of the processing are written to shared memory 140, and sent from CHA 110 to the host 10.

The first storage device 100 is provided with a plurality (for example, eight) of external connection ports (External ports) 111B. These external ports 111B are connected to the ports 211 of the second storage device 200 via the communications network CN2. Furthermore, each external port 111B is also connected to V-VOL 162V. V-VOL 162V is connected to the second storage device 200 via a plurality of paths.

The second storage device 200, can comprise, for example, VDEV 230 established on the memory area provided for each PDEV 220, and at least one LDEV 240 able to be established on VDEV 230. Each LDEV 240 is associated with an LU 250. Furthermore, each LU 250 corresponds to each target port 211.

Each LU 250 of the second storage device 200 is connected to a common LDEV 240. Furthermore, each LU 250 is connected to each external port 111B via each communications network CN2 from each port 211. As described above, each external port 111B is connected to a common V-VOL 162V.

The LDEV 240 of the second storage device 200 is therefore associated with V-VOL 162V via a plurality of paths. Thus, the LDEV 240 within the second storage device 200 can be used as a memory resource of the first storage device 100 from a plurality of paths. One assembly of V-VOL 162V and LDEV 240 are shown in FIG. 3, however, other V-VOL 162V and LDEV 240 assemblies can also be provided.

The RAID configuration can be applied to VDEV 162 and V-VOL 162V. In other words, one disk drive can also be allocated to a plurality of VDEV 162 and V-VOL 162V (slicing), and one VDEV 162 and one V-VOL 162V can also be formed from a plurality of disk drives.

'LDEV 2' or 'LDEV 3' of the first storage device 100 are equivalent to an actual interior volume, and 'LDEV 1' corresponds to a virtual volume. The 'LDEV' of the second storage device 200 corresponds to an actual volume. When considered from the first storage device 100, the second storage device 200 becomes external storage, and the logical volume 240 of the second storage device 200 becomes an external volume. Furthermore, when considered from the first storage device 100, each port 211 of the second storage device 200 becomes an external port, and the port 111B of the first storage device 100 becomes an internal port.

Figure 4:
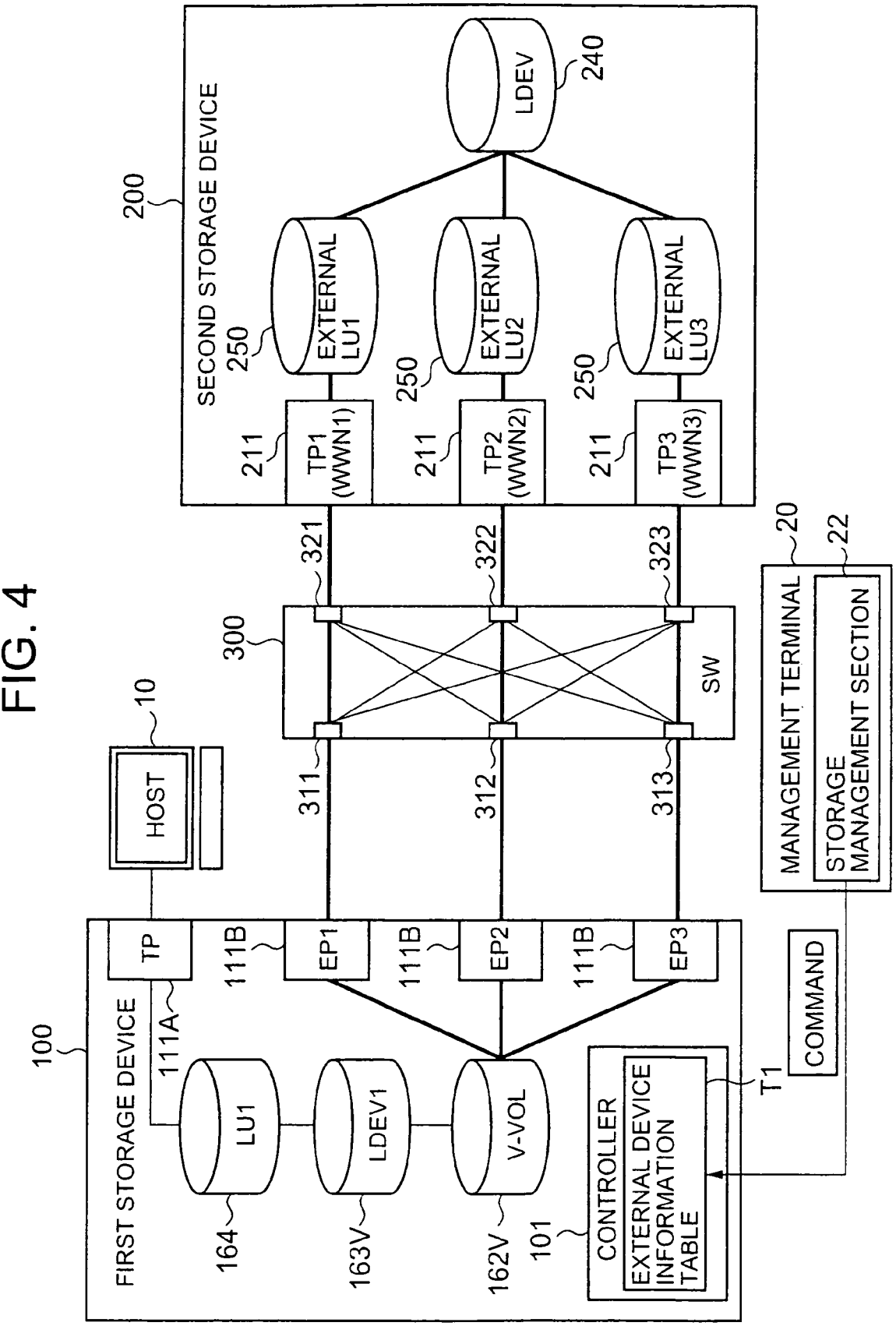
FIG. 4 is a diagram showing an outline of the functional configuration of the storage system.

FIG. 4 shows the configuration of functions of the present embodiment. The controller 101 of the first storage device 100 is comprised of each CHA 110 and each DKA 120, the cache memory 130, and the shared memory 140 and the like.

This controller 101 stores configuration information including the external device information table T1 described below in the shared memory 140. The virtual volume 163V is provided in the first storage device 100. The first storage device 100 can also have the internal volumes 'LDEV 2' and 'LDEV 3' shown in FIG. 3, however since this is not one of the essential points of the present invention, it is omitted from the following description.

The virtual volume 163V (LDEV 1) established in V-VOL 162V is allocated to LU 164, and provided for access from the host 10. The host 10 issues instructions to write data to and read data from the virtual volume 163V.

Furthermore, as described above, V-VOL 162V is connected to each of the external ports 111B, and connected to the actual volume 240 (LDEV) of the second storage device 200 via a plurality of paths.

The second storage device 200 has an actual volume 240. The actual volume 240 is created based on the memory area of the disk drives 220. The actual volume 240 is connected to the V-VOL 162V of the first storage device 100 via a plurality of paths.

The switch 300 is positioned between the first storage device 100 and the second storage device 200, and connects the first storage device 100 and the second storage device 200. The switch 300 has a plurality of single-side ports 311, 312, and 313, and a plurality of other-side ports 321, 322, and 323. Each single-side port 311 through 313 is connected to the external port 111B (EP1 through EP3) of the first storage device 100. Each other-side port 321 through 323 is connected to the target port 211 (TP1 through TP3) of the second storage device 200.

In FIG. 4, three paths are shown as one example. The first path begins with V-VOL 162V, continues to port EP1, port 311, port 321, and port TP1 in that order, and reaches LDEV 240. Similarly, the second path begins with V-VOL 162V, continues to port EP2, port 312, port 322, and port TP2 in that order, and reaches LDEV 240. Similarly, the third path begins with V-VOL 162V, continues to port EP3, port 313, port 323, and port TP3 in that order, and reaches LDEV 240. The number of paths is not limited to three.

The storage management section 22 of the management terminal 20 manages path configuration. The storage management section 22, for example, rewrites the content of the external device information table T1 by sending the prescribed command to the first storage device 100, and establishes and deletes paths and the like.

FIG. 5 shows an example of the external device information table T1 for mapping the actual volume 240 of the second storage device 200 onto the virtual volume 163V of the first storage device 100. The external device information table T1 corresponds to an example of 'mapping information' or a 'mapping table'.

The external device information table T1 can be comprised by associating, for example, a 'VDEV number' to identify the V-VOL 162V, a 'valid path flag' showing which path is valid (abbreviated as 'valid path' in the figure), information to identify external devices, and an external connection path information table.

The valid path flag is information indicating whether or not any of the paths between the V-VOL 162V and the actual volume 240 are valid. Paths for which the flag is set to '1' are valid, and paths for which the flag is reset to '0' are invalid, however a path is not necessarily usable even if valid. As described below, a valid path is in either the 'Normal' or 'Disconnect' state. A path in the 'Disconnect' state exists as a valid path, however it cannot be used.

Information for identification of external devices may be, for example, chassis information, device identification information, actual volume 240 memory capacity, and device type information indicating actual volume 240 type.

Chassis information is information for identification of the second storage device 200, and includes, for example, vendor name, product name, and serial number and the like. Device identification information is information for identification of the actual volume 240. Device type information indicates, for example, whether a device is a tape-system device, or a disk-system device.

The V-VOL 162V being the path start point, and the actual volume 240 being the path end point, can be specified with the afore-mentioned VDEV number and device identification information. The practical configuration for the plurality of paths between the volumes 162V and 240 is indicated in the external connection path information.

The external connection path information table can be configured by associating, for example, a number for each path (path number), information for identification of external ports (the port number and WWN and the like), the WWN for identification of ports (external ports) 211 of the second storage device 200, LUN numbers for identification of LUN of the second storage device 200, path state, and path priority.

Path state can be either 'Normal' or 'Disconnect'. Paths in the Normal state can be used for access to the actual volume 240. Paths in the Disconnect state are logically disconnected, and cannot be used for access to the actual volume 240.

Priority is information indicating the order of use of each path. Here, the number becomes smaller as priority increases. Each path has a different priority. If, for example, a path currently in use becomes unusable due to a failure and the like, priority is used as information for selection of a alternate path.

By incorporating the external connection path investigation table in the external connection path information table T1 as shown in FIG. 5, the controller 101 can specify a path to access the actual volume 240 by simply referencing this table T1. The external connection path information table can be disconnected from the external device information table T1, and both tables configured as different tables.

Figure 6:
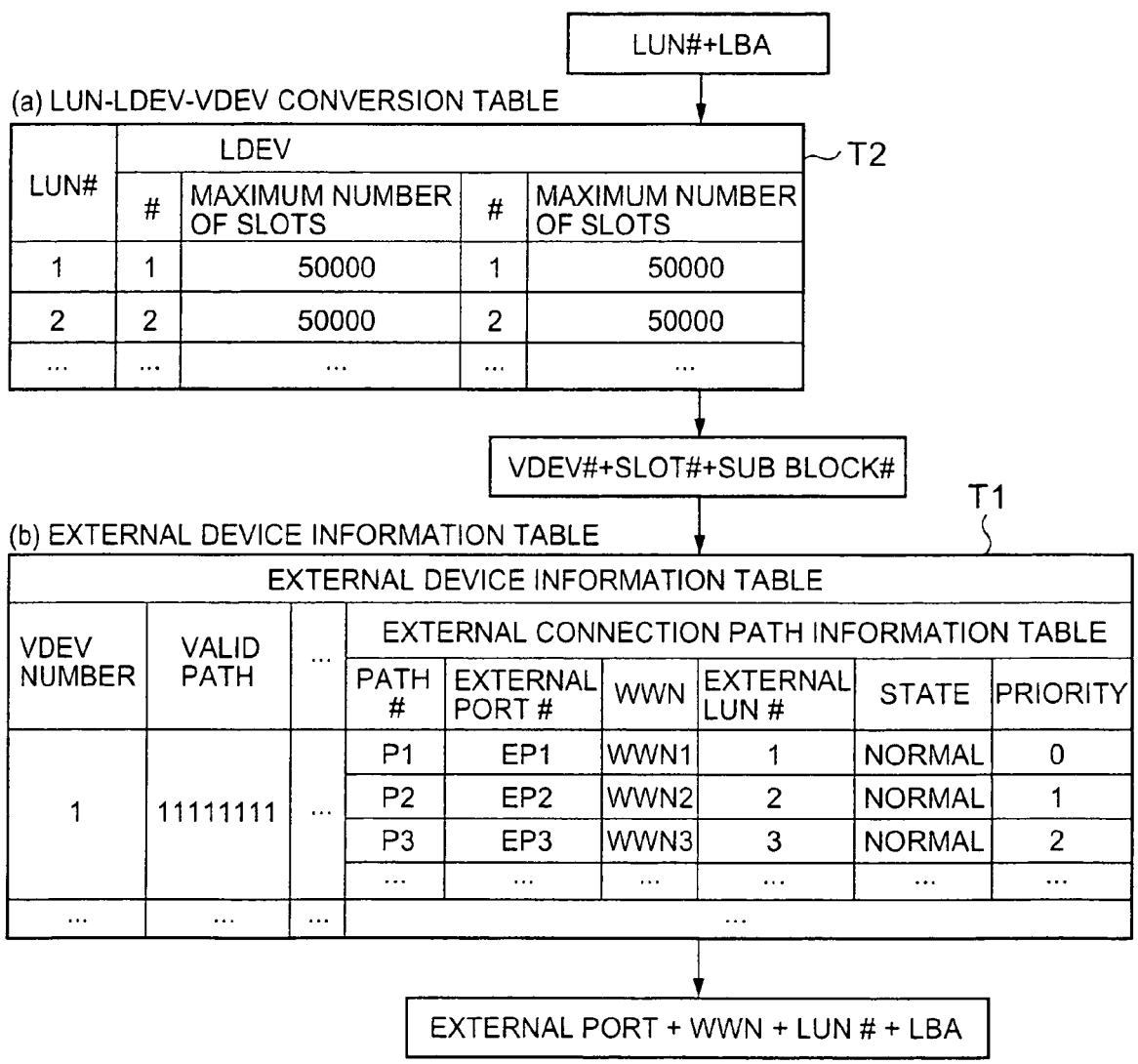
FIG. 6 shows address conversion when data is written to an external volume incorporated as a virtual volume.

FIG. 6 shows conversion of data using various tables. As shown at the top of FIG. 6, the host 10 specifies the LUN number (LUN #) and logical block address (LBA) for the prescribed target 111A, and sends data.

The first storage device 100 converts data (LUN #+LBA) input from the host 10 to VDEV data based on the conversion table T2 shown in FIG. 6 (a). This conversion table T2 is a LUN-LDEV-VDEV conversion table for conversion of data specifying LUN within the first storage device 100 to VDEV data.

This conversion table T2 is configured by associating, for example, the LUN number (LUN #), the LDEV number (LDEV #) associated with this LUN, and the maximum number of slots, with the VDEV (including V-VOL) number (VDEV #) associated with LDEV, and the maximum number of slots, and the like. By referencing this conversion table T2, the data (LUN #+LBA) from the host 10 is converted to VDEV data (VDEV #+SLOT #+SUBBLOCK #).

Next, the first storage device 100 references the external device information table T1 as shown in FIG. 6 (b). Thus, the first storage device 100 converts VDEV data to data sent to and stored in the second storage device 200 for LUN use. For reasons of convenience of description, the configuration of the external device information table T1 shown in FIG. 5 is partially shown in FIG. 6 (b).

For example, the VDEV number (VDEV #), the valid path flag, the number of the external port for sending data from VDEV to the second storage device 200, the WWN to specify the second storage device 200, a LUN able to be accessed via the port, and path state and priority, are associated in the external device information table T1.

Based on this external device information table T1, the first storage device 100 converts write data address information into external port number #+WWN+LUN #+LBA format. Data for which this address information is changed reaches the other port 211 from the specified external port 111B via the communications network CN2. The data is then stored in the prescribed location in LDEV 240.

When the access Y/N attribute is set for the virtual volume 163V, the access attribute management table is stored in shared memory 140. Details are omitted, however the access attribute can be, for example, 'Read/write enabled', 'Write protected (read only)', 'Read/write disabled', 'Free space 0', 'Cannot set copy destination', or 'Hidden'.

'Read/write enabled' indicates a state wherein reading from and writing to a volume is possible. 'Write protected' indicates a state wherein writing to a volume is prohibited, and reading from the volume is permitted. 'Read/write disabled' indicates a state wherein reading from and writing to a volume is prohibited. 'Free space 0' indicates a state wherein a response indicating zero space remaining (full) is returned for an inquiry on volume space remaining, even if free space is available in practice. 'Cannot set copy destination' indicates a state wherein a volume cannot be set as a copy destination volume (secondary volume). 'Hidden' indicates a state wherein recognition from an initiator is not possible.

Figure 7A:
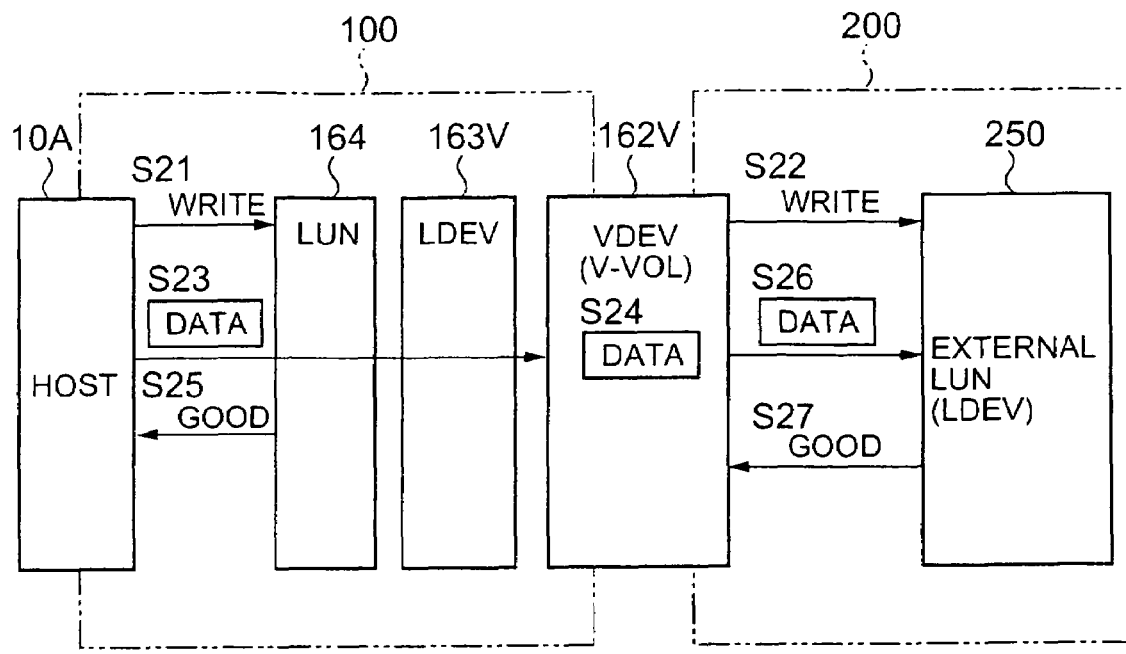
FIG. 7 shows an outline of writing data to an external storage device used as a virtual volume.
Figure 7B:
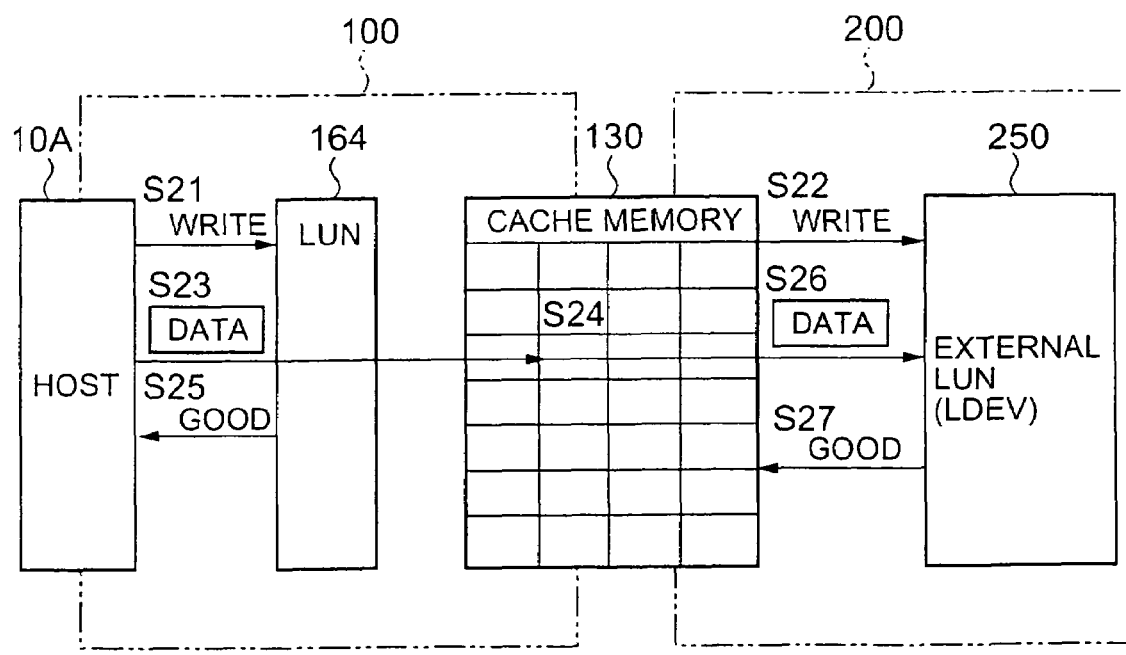

Data input and output between the first storage device 100 and the second storage device 200 is described below based on FIG. 7 and FIG. 8. FIG. 7 is a schematic diagram showing processing when data is written. The host 10 can write data to the logical volume (LDEV) 163V having access privileges. For example, the host 10 can be set so that it accesses only a specific LDEV by zoning wherein a virtual SAN subnet is established in a SAN, and a method of LUN masking wherein through-hole host 10 holds an accessible LUN list.

When the volume 163V to which the host 10 attempts to write data is connected to the external volume 240 via the V-VOL 162V, data flow is as shown in FIG. 7. FIG. 7 (*a*) shows flow in relation to the memory layer, and FIG. 7 (*b*) shows flow in relation to the method with which the cache memory 130 is used.

The host 10 declares the LDEV number specifying the volume 163V to which data is written, and the WWN specifying the port 111A for accessing this volume 163V, and issues the write command (Write) (S21). When the first storage device 100 receives the write command from the host 10, a write command for sending data to the second storage device 200 is created and sent to the second storage device 200 (S22). The first storage device 100 changes address information and the like in the write command received from the host in accordance with the external volume 240 to create a new write command.

The host 10 sends write data to the first storage device 200 (S23). Write data received by the first storage device 100 is transferred from the volume 163V via V-VOL 162V (S24) to the second storage device 200 (S26). Here, the first storage device 100 returns a write complete response (Good) (S25) to the host 10 immediately the data from the host 10 is stored in the cache memory 130.

Immediately the second storage device 200 receives write data from the first storage device 100 (or immediately write to the disk drive 220 is complete), a write complete report is sent to the first storage device 100 (S26). In other words, the time at which the first storage device 100 reports write complete to the host 10 (S25), and the time at which data is actually stored on the disk drive 220, differ (asynchronous method). Prior to write data being actually stored on the disk drive 220, therefore, the host 10 is released from data write processing, and other processing can be conducted.

FIG. 7 (*b*) shows a plurality of subblocks in the cache memory 130. The first storage device 100 converts logical block addresses specified from the host 10 into subblock addresses, and stores data in the prescribed location in the cache memory 130 (S24). In other words, V-VOL 162V and VDEV 162 each exist logically in the cache memory 130 memory space.

Figure 8A:
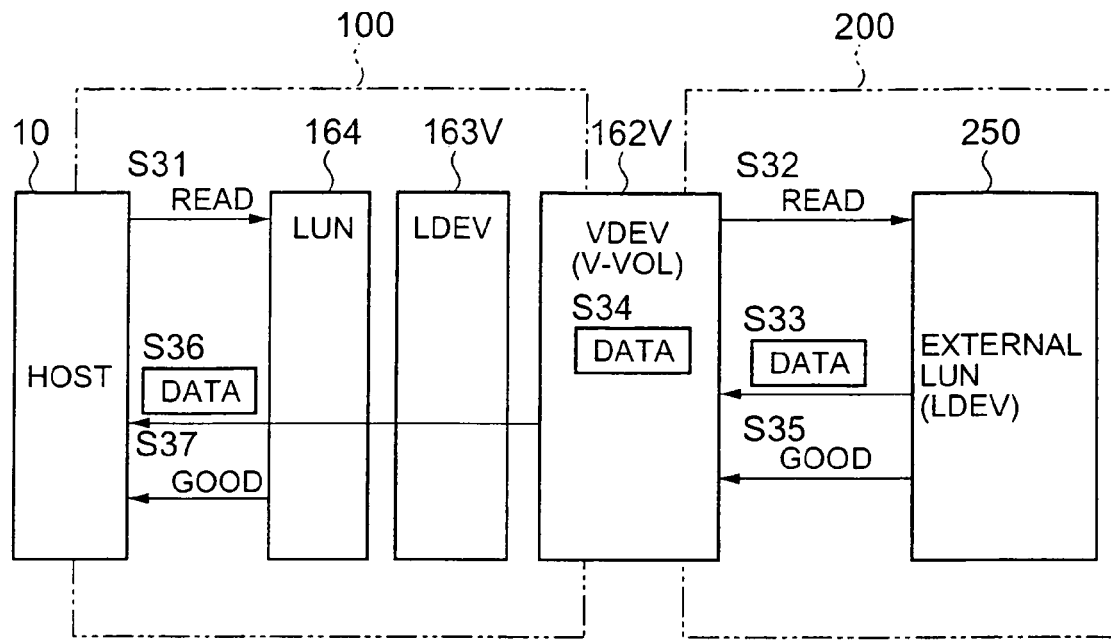
FIG. 8 shows an outline of reading data from an external storage device used as a virtual volume.
Figure 8B:
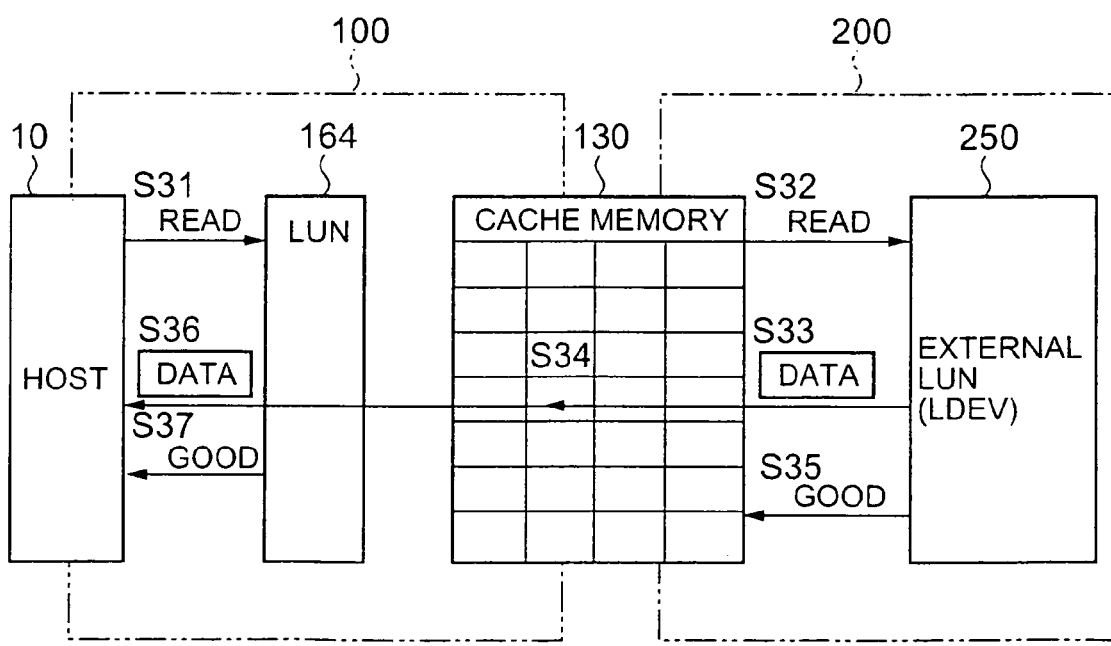

FIG. 8 shows the flow when data is read from the external volume 240 of the second storage device 200. Firstly, when the host 10 specifies the port 111A and sends a data read command (Read) to the first storage device (S31). When the first storage device 100 receives the read command, it creates a new read volume from which the requested data is to be read from the second storage device 200

The first storage device 100 then sends the created read command to the second storage device 200 (S32). The second storage device 200 reads the requested data from the disk drive 220 in response to the read command received from the first storage device 100. The second storage device 200 sends this read data to the first storage device 100 (S33), and reports completion of normal read (S35). As shown in FIG. 8 (*b*), the first storage device 100 stores data received from the second storage device 200 in the prescribed location in the cache memory 130 (S34).

The first storage device 100 reads the data stored in the cache memory 130, converts addresses, sends data to the host 10 via LUN 164 (S36), and reports completion of read (S37). Conversion operation during this sequence of processing when data is read is the reverse of that described with FIG. 6.

FIG. 8 shows data read from the second storage device 200 in response to a request from the host 10 as being held in the cache memory 130, however it is not limited to this, and all or part of the data stored in the volume 240 of the second storage device 200 can be previously stored in the cache memory 130. In this case, data can be read from the cache memory 130 and sent to the host 10 immediately in response to a read command from the host 10.

FIG. 9 is a flowchart showing an outline of processing to acquire configuration information for the second storage device 200. Firstly, the first storage device 100 logs in to the second storage device 200 via the CHA 110 external port 111B (S41). Login is completed when the second storage device 200 returns a response to the first storage device 100 login (S42). Next, the first storage device 100 sends, for example, an inquiry command as determined under the SCSI (Small Computer System Interface) standard to the second storage device 200 requesting detailed information on the volume 240 of the second storage device 200 (S43).

The inquiry command is used to clarify the type and configuration of the device being the subject of the inquiry, and is able to permeate the layers of the device subject to inquiry (second storage device 200), and determine its physical structure. By using the inquiry command, the first storage device 100 can, for example, acquire information such as the device name, the device type, the manufacturing number (product ID), the LDEV number, the version information, and the header ID and the like from the second storage device 200 (S44). The second storage device 200 sends the information being the subject of the inquiry to the first storage device 100 and responds (S45).

The first storage device 100 registers the information acquired from the second storage device 200 in the prescribed location in the external device information table T1 (S46). The first storage device 100 reads the storage capacity of the volume 240 from the second storage device 200 (S47). The second storage device 200 returns the storage capacity of the volume 240 (S48) in response to an inquiry from the first storage device 100, and returns a response (S49). The first storage device 100 registers the storage capacity of the volume 240 in the prescribed location in the external device information table T1 (S50). The external device information table T1 can be constructed with the afore-mentioned processing and the like.

Figure 10:
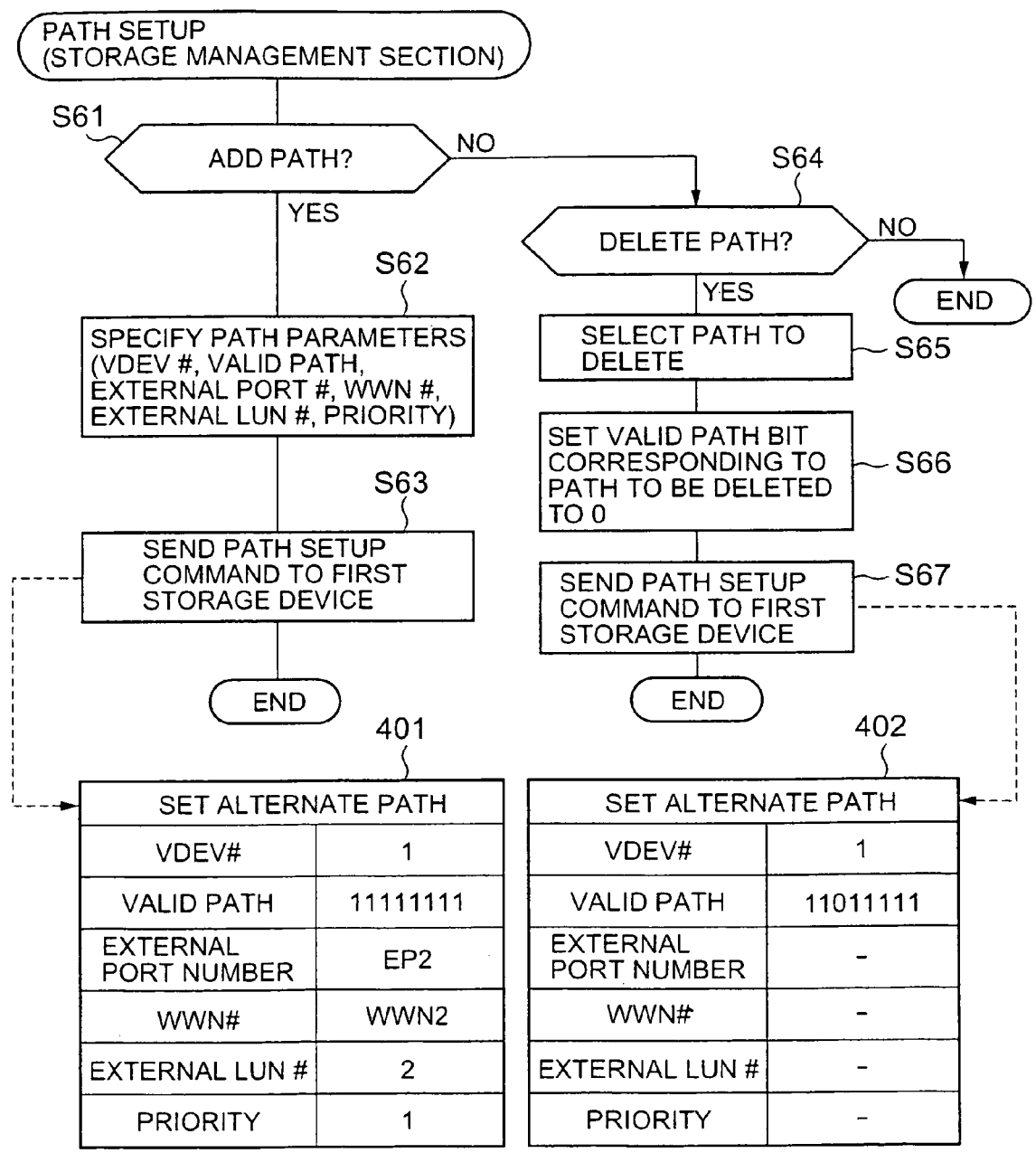
FIG. 10 is a flowchart showing path setup processing.

FIG. 10 is a flowchart showing an outline of the processing to establish a path linking V-VOL 162V and the external volume 240. This processing can be, for example, executed by the storage management section 22 of the management terminal 20.

The screen for path setup is displayed on the terminal screen of the management terminal 20. By using this screen, a user such as the system manager and the like can select to add or delete paths.

When adding paths (S61: YES), the user specifies the parameters of the path to be added (S62). Parameters can be, for example, the VDEV number, the valid path flag, the external port number, the WWN, the external LUN number, and the priority.

When the parameters necessary for addition of a path are specified (S62), the management terminal 20 creates the command for addition of a path, and sends this command to the second storage device 200 via the communications network CN3 (S63).

An example of the command 401 in the case of adding a path is shown at the bottom of FIG. 10. Values specified by the user are stored in the parameters of the add path command (Set Alternate Path). When the first storage device 100 receives this command, a new path is added to the external device information table T1. Comparison with the external device information table T1 shown in FIG. 5 shows that most of the information necessary to define the configuration of the new path is included in the command 401. In other words, the command 401 includes most of a single-line array of the table T1. When the first storage device 100 receives the command 401, the information included in the command 401 therefore need only be registered in the table T1, and a path can be comparatively easily added.

On the other hand, when the user desires to delete a path (S61: NO, S64: YES), the user selects the path to be deleted (S65). The management terminal 20 resets the bit in the valid path flag corresponding to the selected path to 0 (S66). The management terminal 20 creates the delete command 402, and sends this command 402 to the first storage device 100 (S67).

As shown at the bottom of FIG. 10, the delete path command 402 is configured similarly to the add path command 401. However, in practice, the delete path command 402 parameters include, for example, only the valid path flag and the VDEV number for the path to be deleted, and other parameters are set to a null state. For example, when deleting the third path, a valid path flag having the third bit reset is created. The first storage device 100 checks the state of the valid path flag, and deletes the third path information from the external device information table T1.

Figure 11:
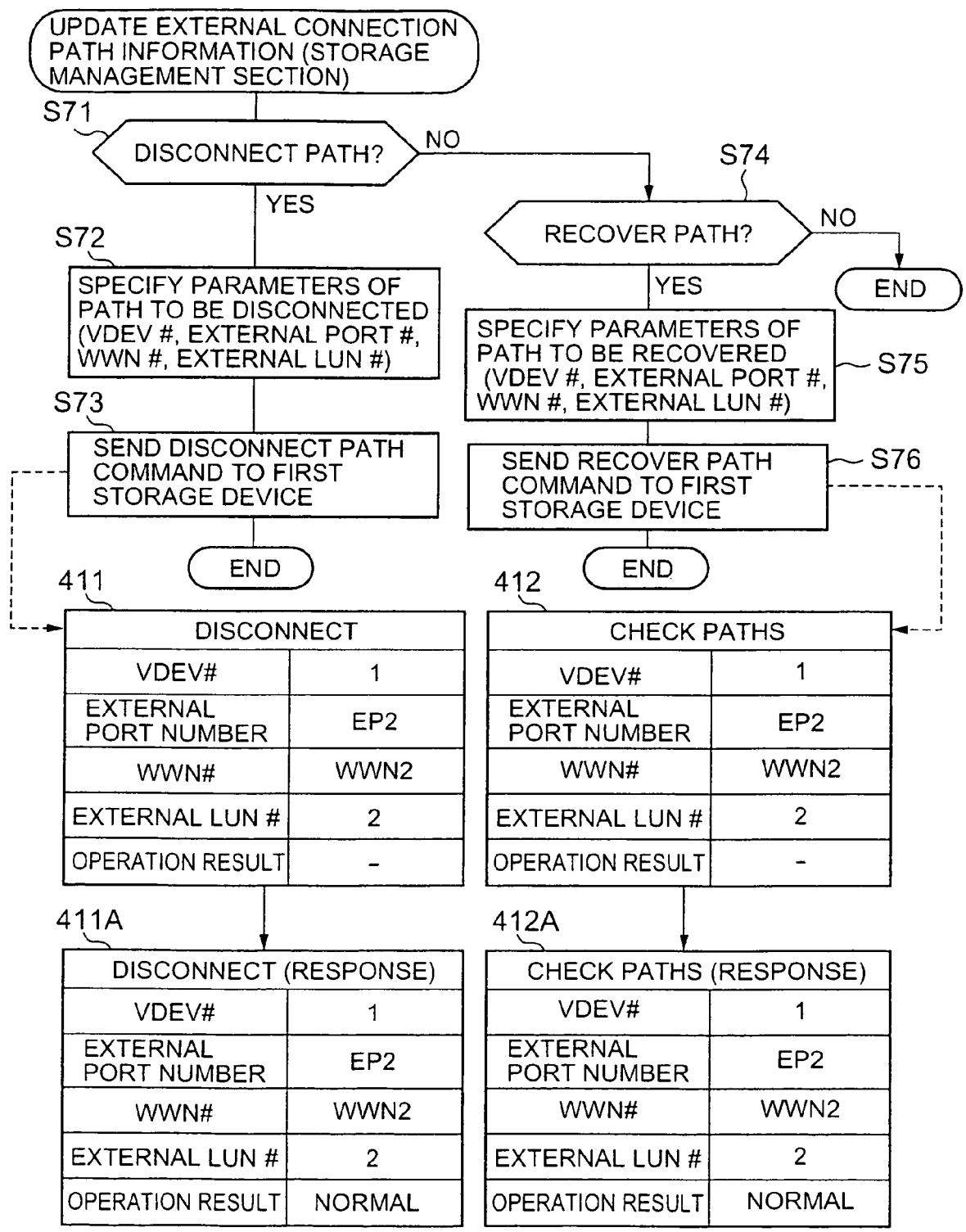
FIG. 11 is a flowchart showing update processing of connection information for an external path.

FIG. 11 is a flowchart showing an outline of update processing for external connection paths. This processing can, for example, disconnect a path, or recover a disconnected path. This processing is also executed by the storage management section 22 of the management terminal 20.

The user can select disconnection of a path, or recovery of a path, on the path update screen displayed on the terminal screen of the management terminal 20. When disconnecting a path (S71: YES), the user specifies the parameters of the path to be disconnected (S72). Parameters can be, for example, the VDEV number, the external port number, the WWN, and the external LUN number and the like. Here, priority need not be specified. Priority is maintained unchanged when a path is logically disconnected. When the management terminal 20 acquires the parameters used for path disconnection, the disconnect path command 411 is created, and sent to the first storage device 100 (S73).

The disconnect path command 411 can be, for example, configured to include information indicating the disconnect path instruction (Disconnect), and the VDEV number, the external port number, the WWN, the external LUN number, and the operation result. The operation result field stores the state returned from the first storage device 100. In other words, as shown in the command 411A returned from the first storage device 100, when logical disconnection of a path is completed normally, information indicating 'Normal' is stored in the operation result field.

The disconnected path is no longer subject to periodic monitoring by the first storage device 100. Furthermore, the disconnected path cannot be used for sending of data. Even when a path is disconnected, its priority does not change, however, it cannot be set as an alternate path, and the connection state of a disconnected path prior to input and output is therefore also not checked.

On the other hand, when the user desires recovery of a path (S71: NO, S74: YES), the user inputs the parameters required to specify the path to be recovered (S75). These parameters are similar to those described in S72. The management terminal 20 creates the path recovery command 412, and sends it to the first storage device 100 (S76).

Except for information indicating command type, the path recovery command (Check Paths) may be configured similarly to the disconnect path command 411. When the first storage device 100 is successful in path recovery operation, the command 412A is returned from the first storage device 100 to the management terminal 20, and information indicating 'Normal' is stored in the operation result field.

Figure 12:
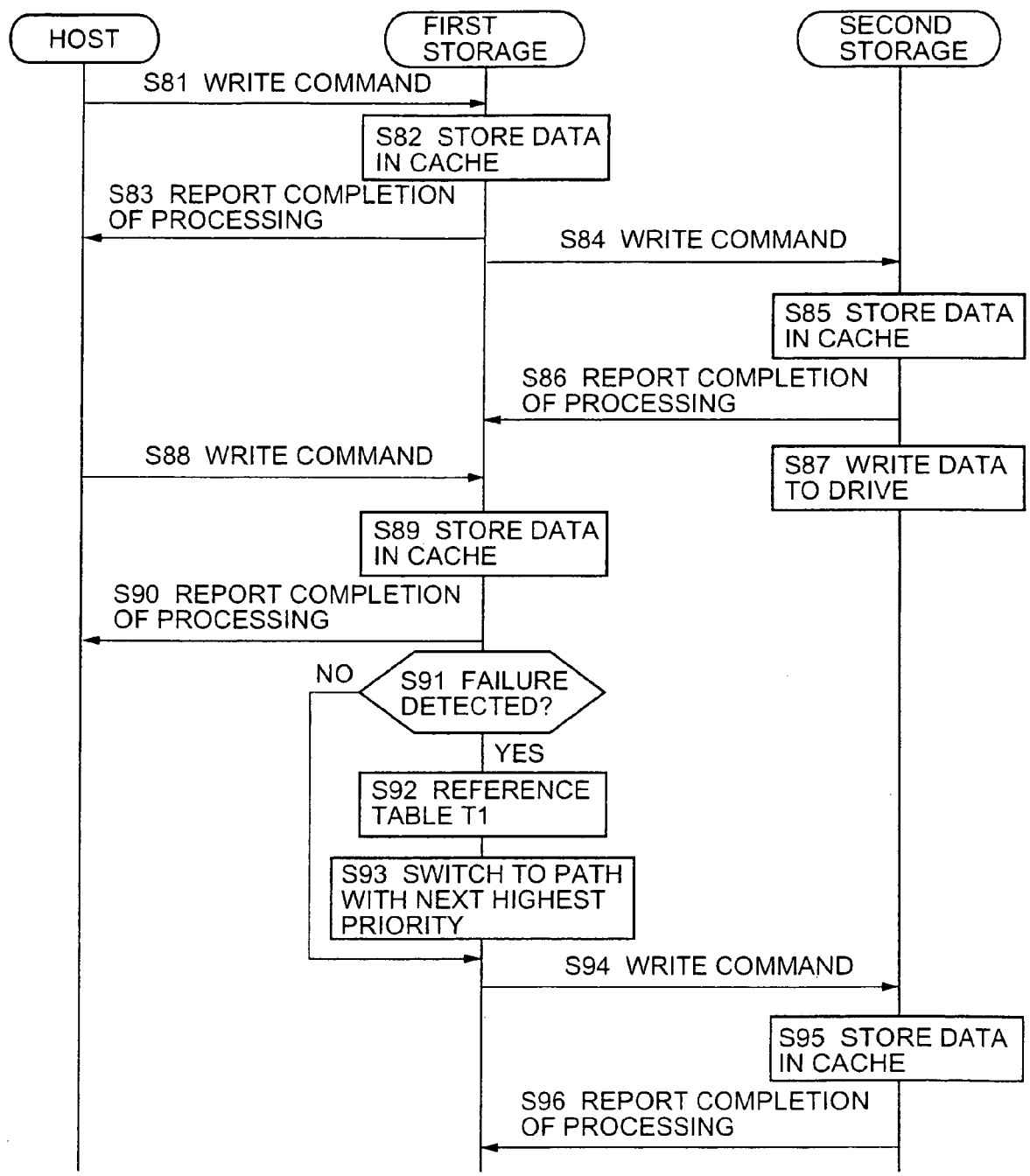
FIG. 12 is a sequence flowchart showing overall operation when a write command is processed.

FIG. 12 is a sequence flowchart showing an outline of operation when a failure occurs while processing a write command.

The host 10 issues a write command to the first storage device 100 for writing to the virtual volume 163V (S81). The first storage device 100 stores write data received from the host 10 in the cache memory 130 (S82). After storing write data in the cache memory 130, the first storage device 100 immediately reports completion of processing to the host 10 (S83).

Furthermore, the first storage device 100 references the external device information table T1 and creates a new command, and sends this new command to the second storage device 200 via the specified external port 111B (S84). The specified external port 111B used in data communications is, for example, the port of the path having the highest priority of all paths currently in use.

When the second storage device 200 receives write data from the first storage device 100, it writes this data to the cache memory (S85) and issues a response to indicate completion of processing (S86). The second storage device 200 writes the cached write data to the prescribed disk drive 220 with the appropriate timing, and destage the data (S87).

On the other hand, when the host 10 receives notification of completion of processing from the first storage device 100 (S83), the write command and write data are sent again to the first storage device 100 (S88). The first storage device 100 stores write data in the cache memory 130 in the same manner as described above (S89), and reports completion of processing to the host 10 (S90).

The first storage device 100 monitors whether or not a failure has occurred (S91). When a failure is detected (S91: YES), the first storage device 100 references the external device information table T1 (S92), and selects the path having the next highest priority of the paths currently in use (S93). In other words, the first storage device 100 selects one of the paths having the highest priority of the usable paths in place of the path in which the failure has occurred. The first storage device 100 sends the write command to the second storage device 200 in the same manner as described above (S94). The second storage device 200 stores the write data from the first storage device 100 in the cache memory (S95), and reports completion of processing to the first storage device 100 (S96).

For reasons of convenience of description, monitoring of occurrence of a failure is shown following S90 in FIG. 12, however, in practice, failure detection is executed as a process separate from processing of the write command.

As described in detail above, according to the present embodiment, by mapping the external volume 240 onto V-VOL 162V, the external volume 240 can be handled as a logical volume 163V within the first storage device 100. The storage resources of the second storage device 200 can therefore be integrated with the first storage device 100 and used effectively.

In the present embodiment, the first storage device 100 and the second storage device 200 are connected by a plurality of paths, and when a failure occurs in a path currently in use, a configuration using a separate path is adopted. Even when a fault occurs in a port, or a break occurs in a fiber cable and the like, an alternate path is selected, and the access requirement from the host 10 can be processed. Thus, when a failure occurs, an access path to the external volume 240 can be constantly available. Processing of access requests can therefore be continued even when a failure occurs, failure recovery work can be conducted during this period, and reliability and resistance to failures and the like can be improved.

In the present embodiment, priority is preset for each path, and paths having high priority are used first. When a failure occurs, an alternate path can therefore be determined rapidly. Furthermore, if, for example, priority can be specified previously by the user, priority can be set for each path in response to the storage system environment.

In the present embodiment, a configuration wherein a plurality of paths are used, and access to the external volume 240 is possible, is adopted. When a failure occurs, and also when planned maintenance is conducted, benefits can therefore be demonstrated. In other words, when CHA 110 and fiber cables are replaced and the like, paths subject to this maintenance work can be disconnected beforehand, and the path having the next highest priority selected. Thus, maintenance work can be conducted while ensuring a path for the second storage device 200. The first storage device 100 always selects a path based on priority so that a path is always available for access to the second storage device 200.

Second Embodiment

Figure 14:
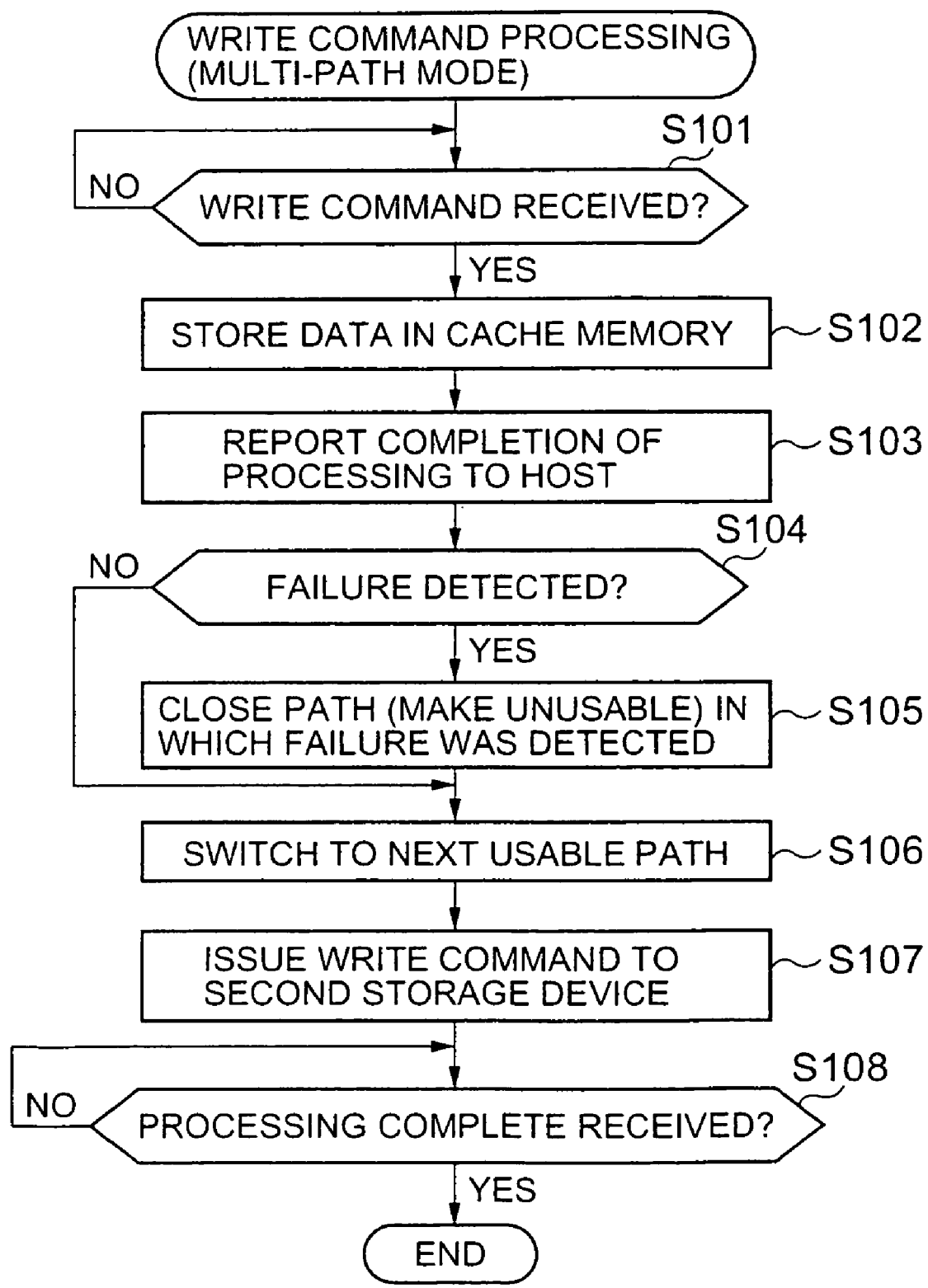
FIG. 14 is a flowchart showing processing of a write command in the multi-path mode.
Figure 15:
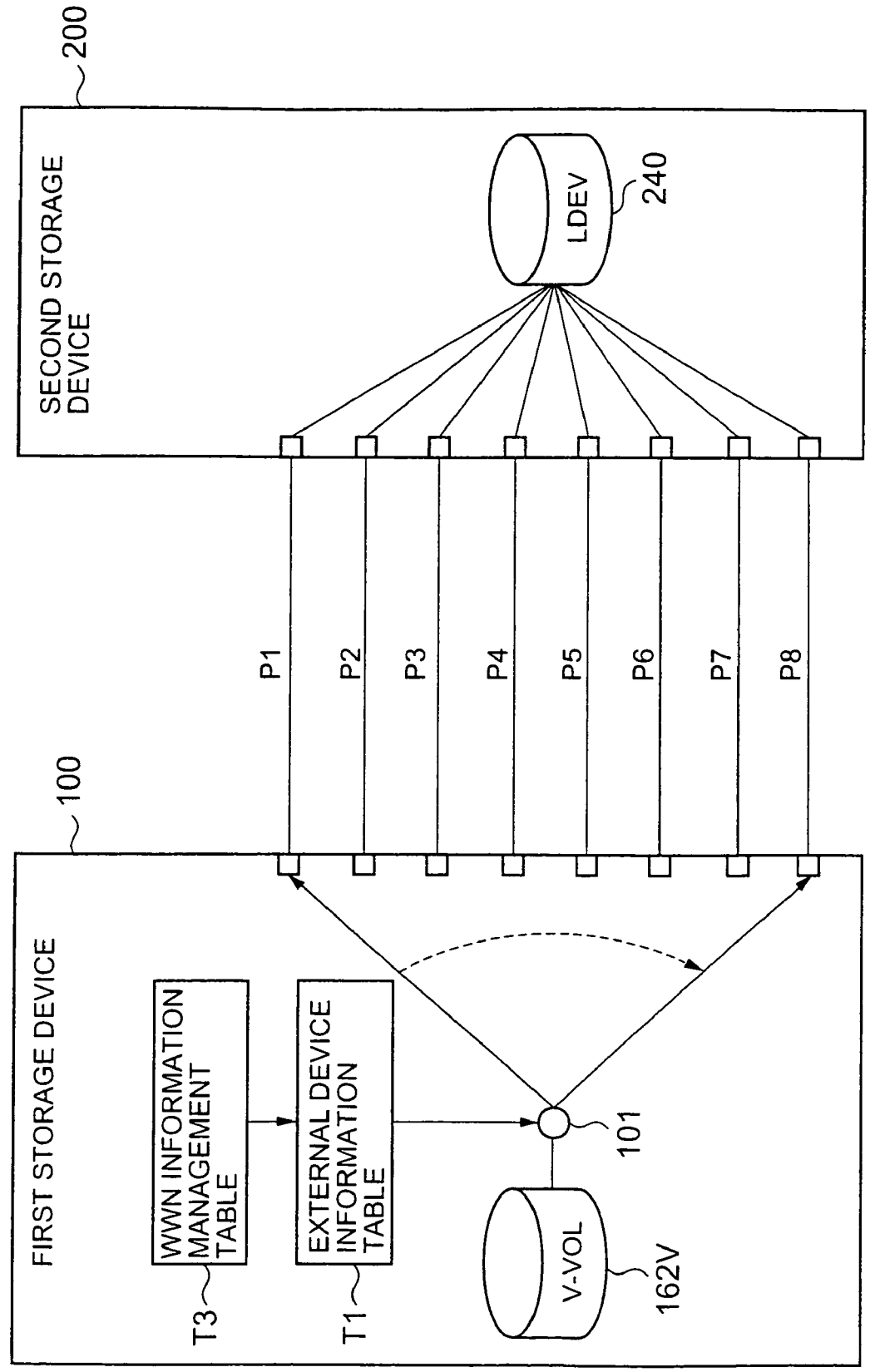
FIG. 15 is a schematic diagram of a storage system operated in the multi-path mode.

The second embodiment is described based on FIG. 13 through FIG. 15. The following embodiments, including the present embodiment, are equivalent to variations of the first embodiment. In the present embodiment, the first storage device 100 and the second storage device 200 are connected by a plurality of paths, and access requests from the host 10 are processed while these paths are selected in sequence.

FIG. 13 shows an example of the WWN information management table T3. The WWN information management table T3 is information for the management of the alternate path mode (use mode) of the second storage device 200 being external storage.

The alternate path mode, can be, for example, the single path mode, or the multi-path mode. The single path mode is a mode wherein one of a plurality of paths is selected for use as described in the first embodiment. The multi-path mode is a mode wherein a plurality of paths are selected in sequence for use as described below.

The alternate path mode, can be, for example, set in units of storage devices. When the second storage device 200 is used in the single path mode, as shown in FIG. 13, the single path mode is set in the WWN of each port 211 of the second storage device 200. When the second storage device 200 is used in the multi-path mode, the multi-path mode is set in each WWN identifying each port 211.

The condition in which the alternate path mode is set for each of the plurality of storage devices is shown in FIG. 13. However, different types of alternate path modes can be mixed within the same storage device in some cases.

Next, FIG. 14 is a flowchart showing an outline of processing of a write command in the multi-path mode. When the first storage device 100 receives the write command and write data from the host 10 (S101: YES), it stores the write data in the cache memory 130 (S102), and reports completion of processing to the host 10 (S103).

The first storage device 100 monitors whether or not a failure has occurred (S104). When a failure is detected (S104: YES), the first storage device 100 closes the external port 111B for the path in which the failure has been detected (S105). The first storage device 100 then selects the next usable path (S106). When a failure is not detected (S104: NO), the first storage device 100 skips S105 and selects the next path (S106).

The first storage device 100 uses the selected path to send the write command to the second storage device 200 (S107), and waits for notification of completion of processing (S108). When completion of processing is reported from the second storage device 200 (S108: YES), this processing is completed. When the host 10 then issues the write command, steps S101 and later are repeated.

FIG. 15 is a schematic diagram showing the case in which operation in the multi-path mode is used. By referencing the WWN information management table T3 and the external device information table T1, the first storage device 100 controller 101 accesses the second storage device 200 while selecting the plurality of paths P1 through P8 in sequence. In other words, when a failure does not occur, a path is selected and used, for example, in the sequence P1, P2, P3, P4 . . . , each time access processing is executed. Even when multiple access from the host 10 is requested, since the wait queue for the paths P1 through P8 can be shortened, processing can be conducted at high-speed. On the other hand, when a failure is detected in any one of the paths, that path is closed and becomes unusable. In this case, the first storage device 100 accesses the second storage device 200 while selecting only normal paths in sequence.

Thus, in the present embodiment, access requests from the host 10 can be processed while selecting the plurality of paths connecting the first storage device 100 and the second storage device 200. Processing can therefore be at higher speed than with the first embodiment, and responsiveness of the storage system can be improved.

Furthermore, even when a failure is detected in any of the paths, since operation for all except that path is continued, resistance to failures can be improved. Furthermore, while conducting maintenance work on any path, another path can

Third Embodiment

The third embodiment is described based on FIG. 16 through FIG. 19. In this embodiment, path operation is possible in prescribed units.

Figure 16:
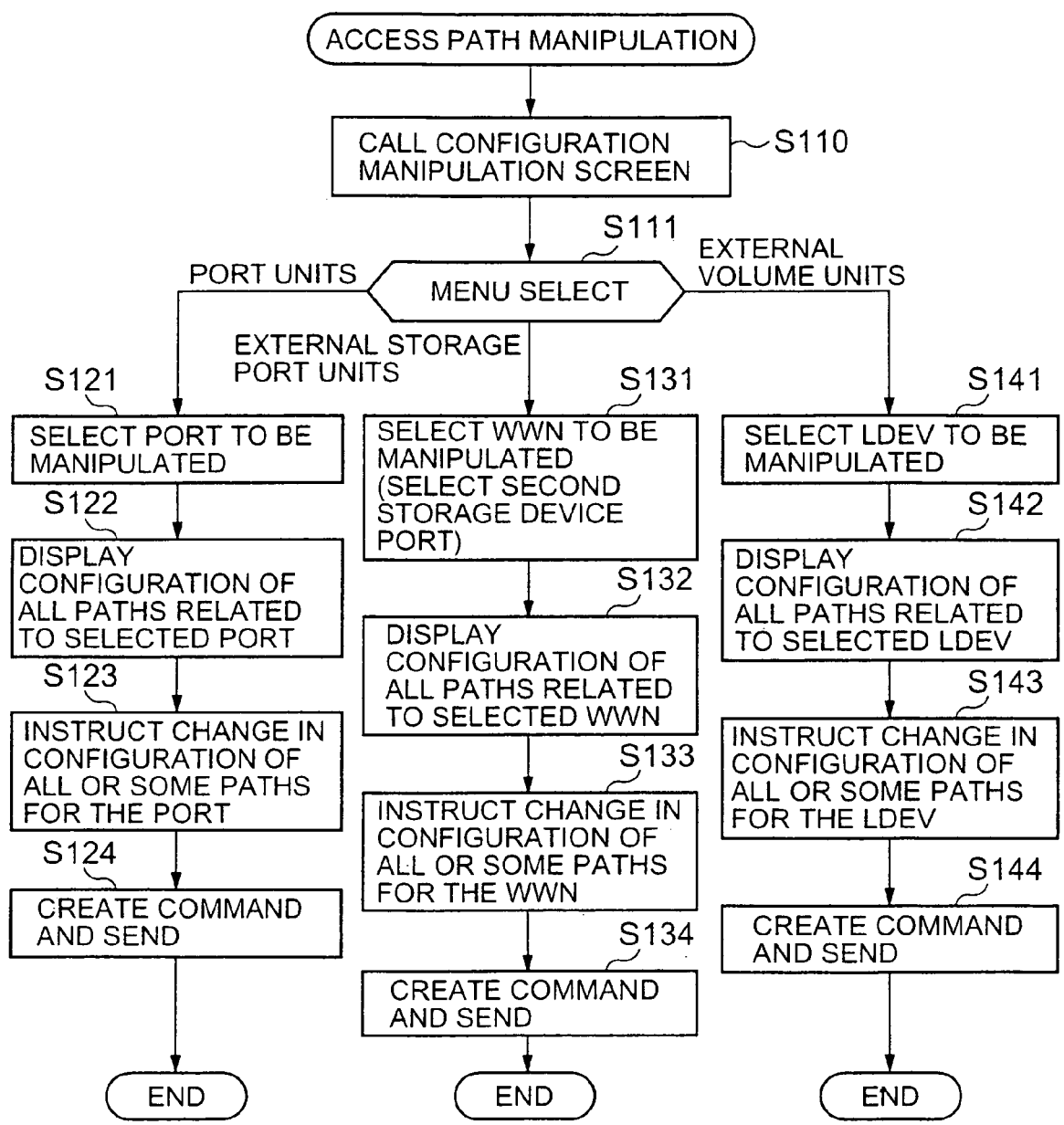
FIG. 16 is a flowchart showing processing for changing path configuration by prescribed unit according to the third embodiment.

FIG. 16 a flowchart showing an outline of path operation processing. This processing can be executed with the storage management section 22 of the management terminal 20. Firstly, the user calls up the path configuration processing screen (S110), and selects from the menu (S111).

The operation menu can be, for example, a menu for manipulating path configuration in units of external ports, a menu for manipulating path configuration in units of external storage ports, or a menu for manipulating path configuration in units of external volumes 240.

When the user desires to process in units of external ports, the user selects the external port to be manipulated (S112). The management terminal 20 displays the configuration of all paths connected to the external port in a list format (S113). The user selects all or some of the displayed paths, and instructs changes in the configuration (S114). Change in the configuration can be, for example, deletion of a path, or change in the statue of a path (Disconnect→Normal, Normal→Disconnect) and the like.

In response to a request from the user, the management terminal 20 creates a command to realize the content requested by the user, and sends this command to the first storage device 100 (S124). Details of this command have been previously described in FIG. 10 and FIG. 11.

As in the above, when the user desires to change path configuration in units of external storage ports (external port units), the user selects the external port for which the configuration is to be changed (S131). The management terminal 20 displays the configuration of all paths connected to the selected external port in a list format (S132). The user selects all or some of the displayed paths, and requests changes in the configuration (S133). The management terminal 20 creates the necessary command, and sends it to the first storage device 100 (S134).

Similarly, when the user desires to change path configuration in units of external volumes, the user selects the desired external volume (S141). The management terminal 20 displays the configuration of all paths connected to the selected external volume in a list format (S142). The user selects all or some of the displayed paths, and requests changes in the configuration (S143). The management terminal 20 creates a command to realize the requested content, and sends it to the first storage device 100 (S144).

When a change in configuration is instructed for a plurality of paths, a command such as described in FIG. 10 and FIG. 11 is created for each path, and sent to the first storage device 100.

Figure 17:
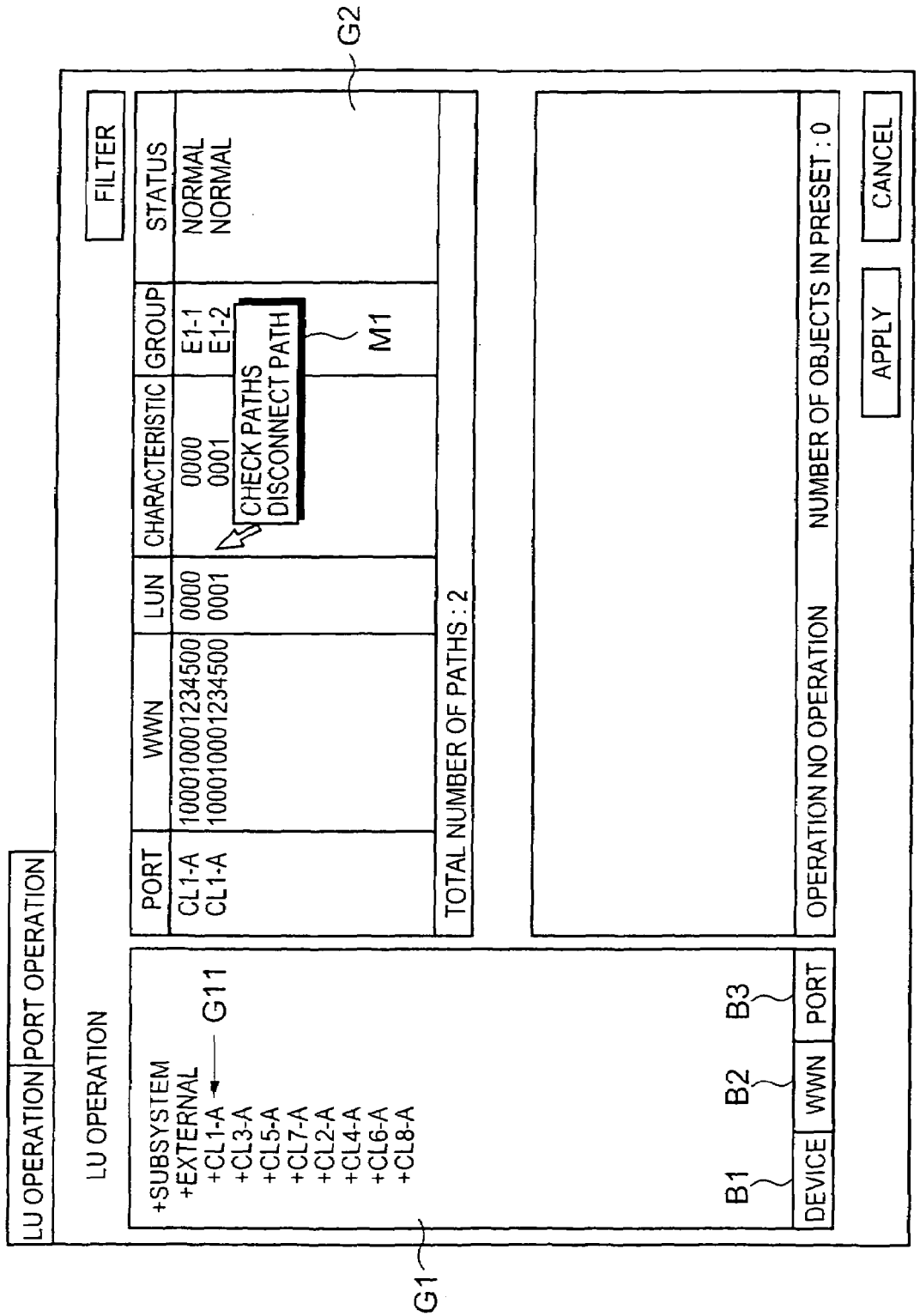
FIG. 17 is a screen example showing changing of path configuration in external connection port units.

FIG. 17 is a screen example showing instructions for changing path configuration in units of external ports. The plurality of tab menus B1 through B3 are provided at the bottom of the area G1. When the user selects the tab menu B3 to instruct display of the external ports, a list of the plurality of external ports is displayed in the area G1. The user can select one of the desired external ports from this list.

When the user selects an external port (G11), the configurations of all paths connected to this port are displayed in a list in the area G2. The user can select one or more (or all, hereafter the same) of the paths for which the configuration is to be changed from the displayed paths. For example, by providing the operation menu M1 in the form of a context menu, the user can then instruct path recovery and path disconnection and the like.

Figure 18:
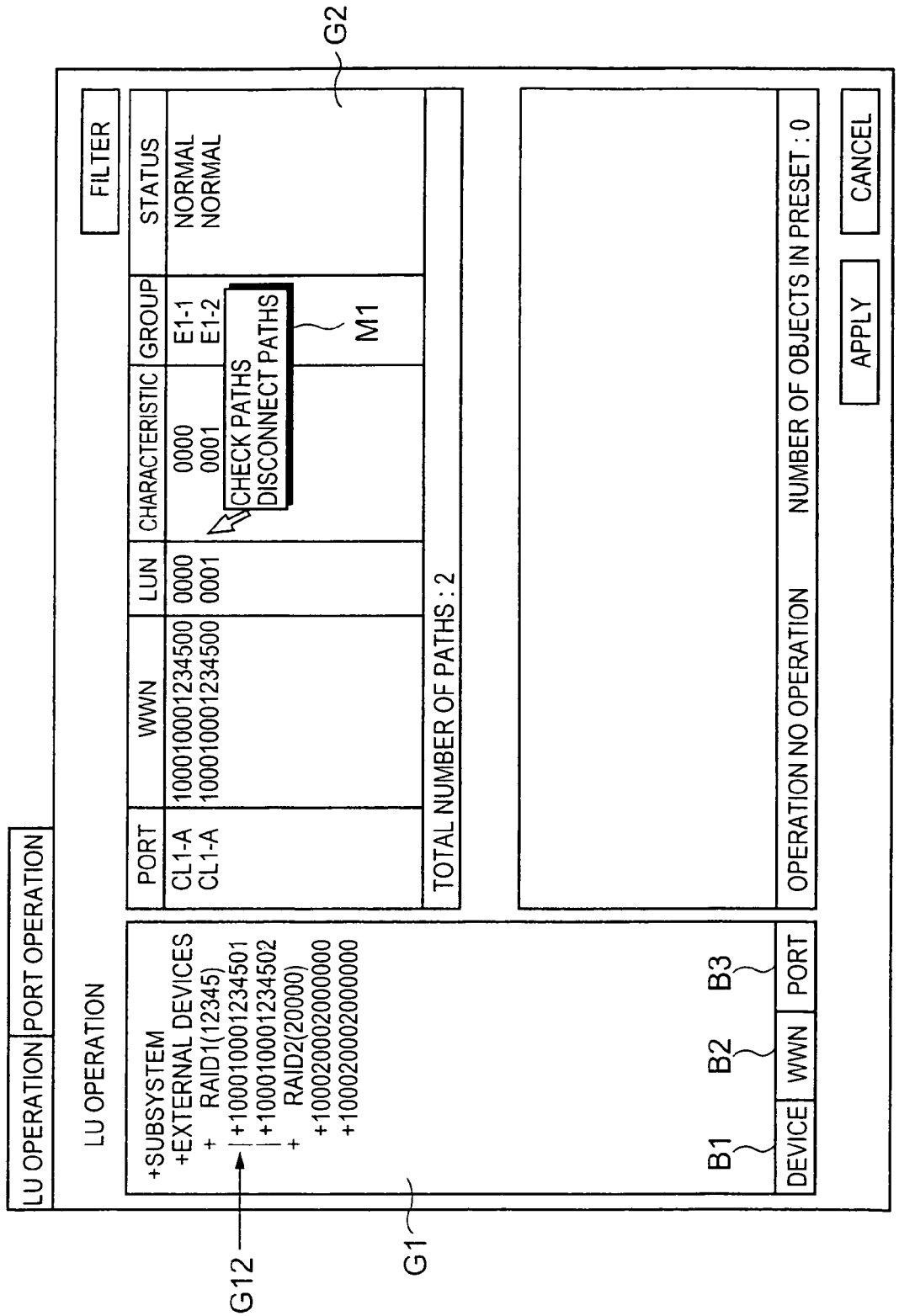
FIG. 18 is a screen example showing changing of path configuration in external port units.

FIG. 18 is a screen example showing instructions for changing path configuration in units of external ports. When the user selects the tab menu B2 to instruct display of the external ports, a list of the plurality of external ports is displayed in the area G1. The user can select one of the desired external ports from this list.

When the user selects an external port (G12), the configurations of all paths connected to this port are displayed in a list in the area G2. As described above, the user can select the desired path for which the configuration is to be changed from the displayed paths. The user can then instruct path recovery and path disconnection and the like with the operation menu M1.

Figure 19:
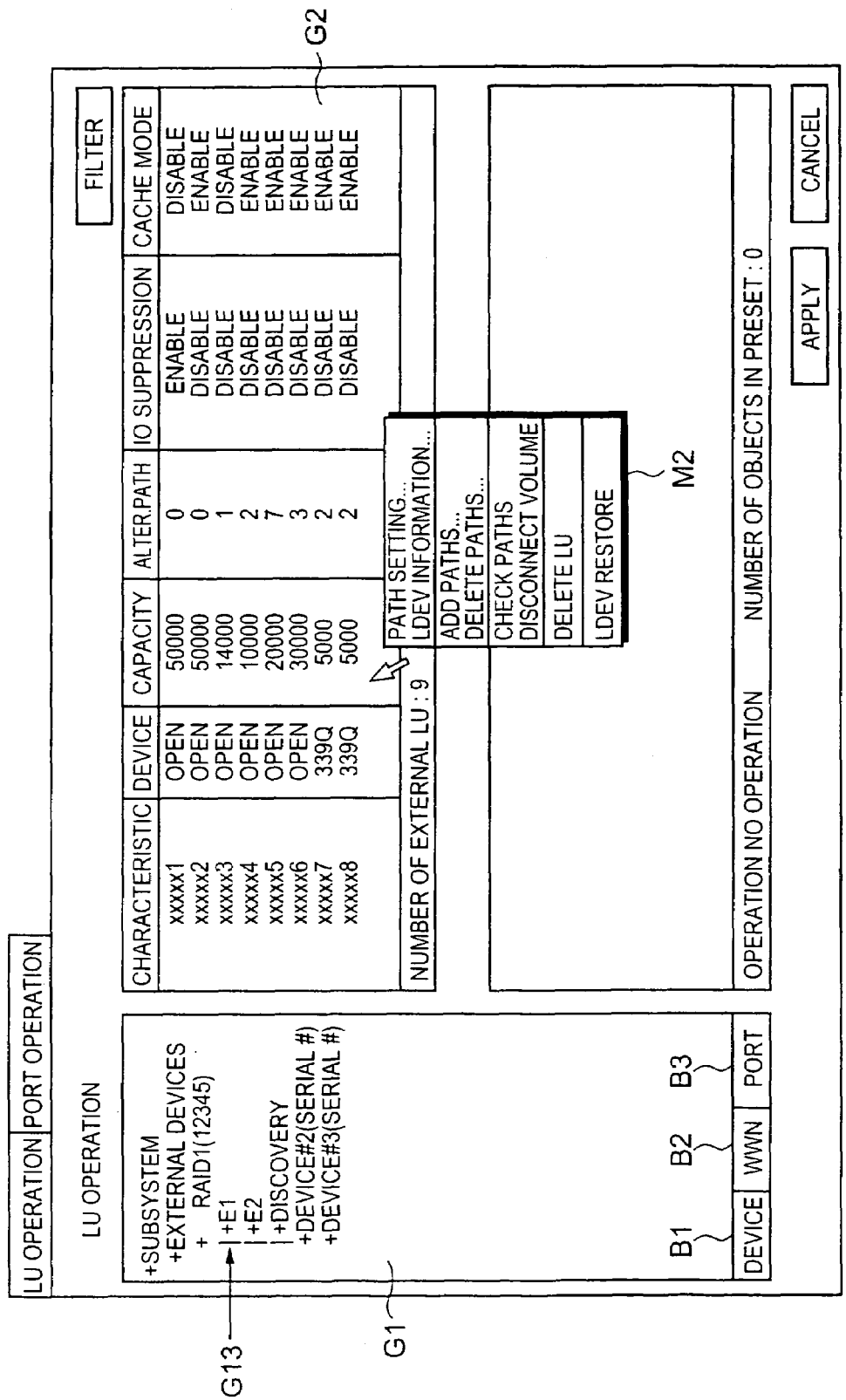
FIG. 19 is a screen example showing changing of path configuration in external volume units.

FIG. 19 is a screen example showing instructions for changing path configuration in units of external volumes. When the user selects the tab menu B1 to instruct display of the external volumes, a list of the external volumes is displayed in the area G1. The user can select one of the desired external volumes from this list.

When the user selects an external volume (G13), the configurations of all paths connected to this volume 240 are displayed in a list in the area G2. The user can select one or more of the desired paths for which the configuration is to be changed from the displayed paths. The user can then instruct path recovery and path disconnection and the like with the operation menu M1.

This embodiment provides for operation to change path configuration to be conducted in the desired units. For example, when conducting maintenance work and the like, all paths related to this work can be changed to the disconnected state together and work conducted. If any usable paths remain in this case, both maintenance work and storage service can be conducted.

Fourth Embodiment

Figure 20:
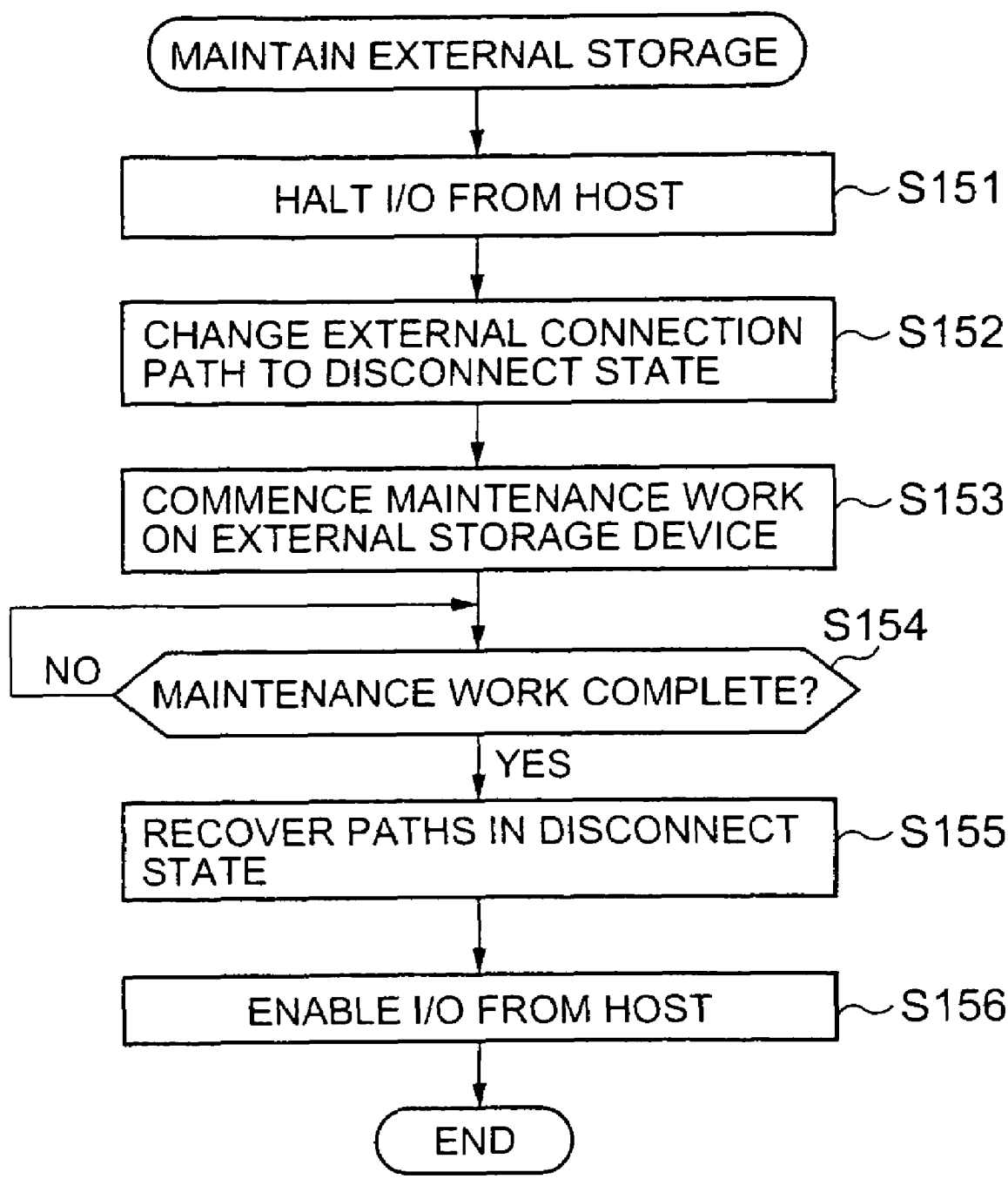
FIG. 20 is a flowchart showing a procedure for external storage maintenance work according to the fourth embodiment.
Figure 21:
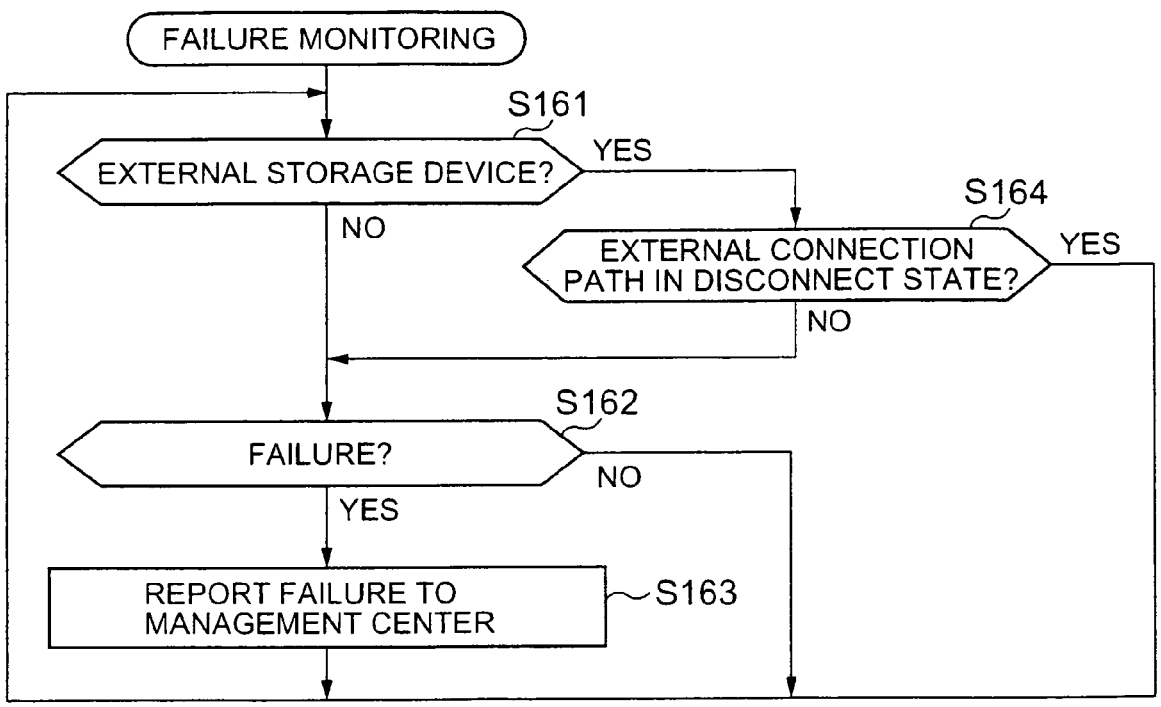
FIG. 21 is a flowchart showing failure monitoring processing.

The present embodiment is described based on FIG. 20 and FIG. 21. This embodiment can prevent mistaken recognition of a failure prior to a planned halt of the second storage device 200.

FIG. 20 is a flowchart showing an outline of the procedure for planned maintenance work on the second storage device 200 as external storage. Firstly, the access request (I/O) from the host 10 to the first storage device 100 is halted (S151).

Next, the states of the paths linking the first storage device 100 and the second storage device 200 are changed to the disconnected state (S152). In this case, as described for the afore-mentioned embodiment, by changing path configuration in units of external ports or external volumes, ease of work can be improved.

After completing such preparations for maintenance, maintenance personnel commence maintenance work on the second storage device 200 (S153). When maintenance work is complete (S154: YES), the states of the disconnected paths are each restored to the normal state (S155). The access request from the host 10 to the first storage device 100 is enabled (S156).

FIG. 21 is a flowchart showing failure detection processing. This processing may be executed by the controller 101 of the first storage device 100. The first storage device 100 evaluates whether or not a path is used for connection with external storage (second storage device 200) (S161).

When the path is not used for external connection (S161: NO), the first storage device 100 evaluates whether or not a failure has occurred in the path (S162). When a failure is detected (S162:YES), the first storage device 100 notifies the management center 30 of the occurrence of a failure (S163). When the management center 30 receives this notification, it communicates this fact to, for example, maintenance personnel.

On the other hand, in the case of an external connection path (S161: YES), the first storage device 100 evaluates whether or not the path is in the disconnect state (S164). When the external connection path is not logically disconnected (S164: NO), the first storage device 100 moves to the previously described S162.

Conversely, when the external connection path is in the disconnected state (S164: YES), the first storage device 100 terminates this processing without evaluating whether or not a failure has occurred. In other words, the logically disconnected external connection path is not subject to failure detection processing, and is ignored.

In the present embodiment, therefore, by changing the disconnection state of the external connection path prior to conducting maintenance work on external storage, sending of an incorrect notification to the management center 30 can be prevented beforehand, and ease of use is improved.

Fifth Embodiment

Figure 22:
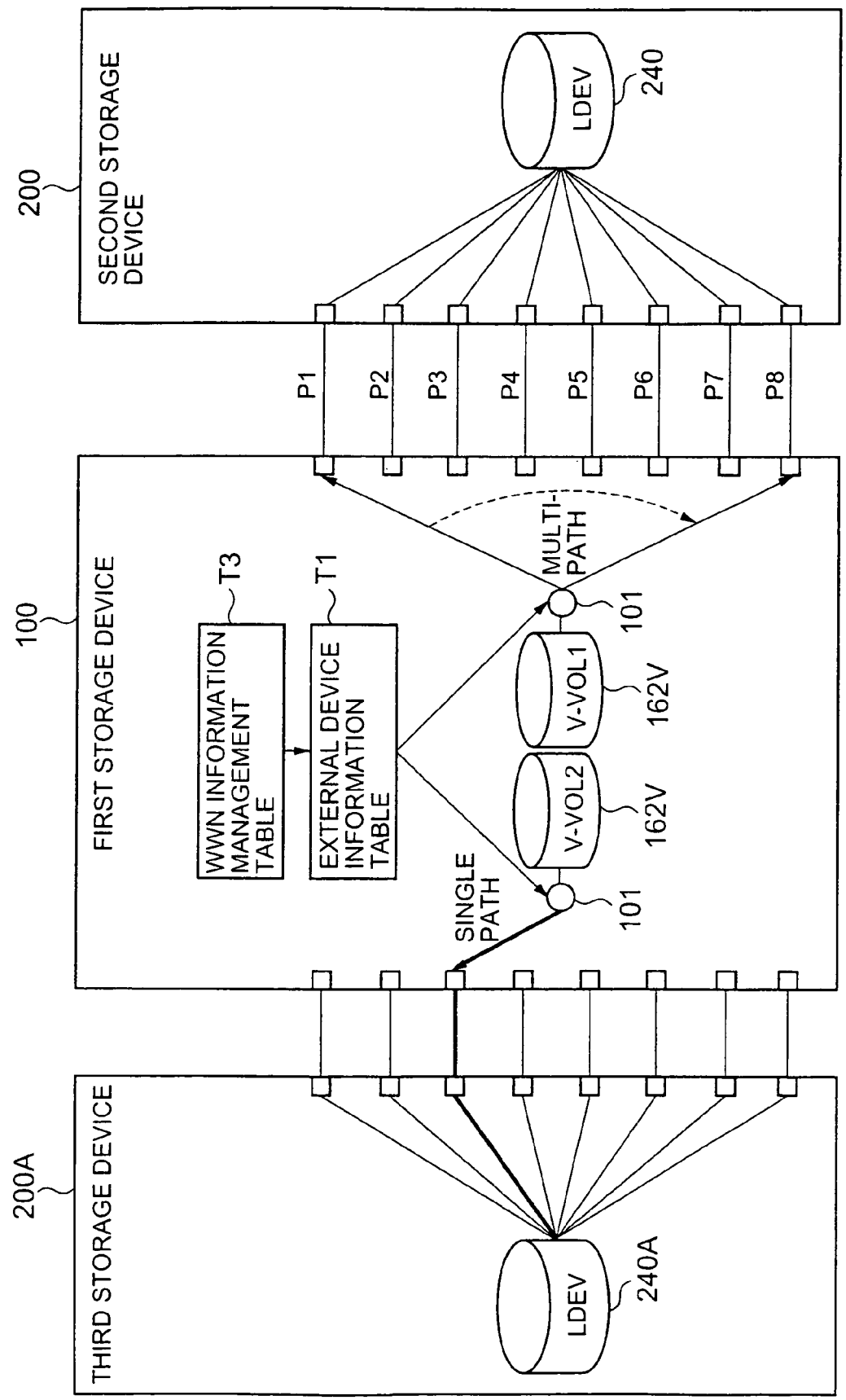
FIG. 22 is a schematic diagram showing the storage system according to the fifth embodiment.

FIG. 22 is a schematic diagram showing the storage system according to the fifth embodiment. As shown in FIG. 22, in addition to the second storage device 200, a third storage device 200A can be added to the first storage device 100.

A plurality of V-VOL 162V are provided within the first storage device 100, volumes 240 and 240A within the distinct external storage 200 and 200A being mapped onto each V-VOL 162V.

The second storage device 200 is then operated in the multi-path mode, and the third storage device 200A is operated in the single path mode. Therefore, for example, when high-speed response is required, the second storage device 200 volume can be used, and when resistance to failure rather than high-speed response is emphasized, the third storage device 200A can be used.

The present invention is not limited to the afore-mentioned embodiments. A variety of additions and changes and the like can be made by a given operator within the scope of the present invention. For example, it is also possible to switch dynamically between the single path mode and multi-path mode while in operation. Furthermore, for example, a plurality of groups each having a plurality of paths can be formed, and the single path mode or multi-path mode may be applied to each path group in some cases.

What is claimed is:

1. A storage system, comprising:
a first storage device having a virtual volume used by a host; and
a second storage device having an actual volume associated with the virtual volume and connected to the first storage device via a plurality of communications paths, each communications path being in a usable or unusable state,
wherein the first storage device comprises:
a mapping management section having mapping information representing connections between the virtual volume and the actual volume by communications paths, and mapping the actual volume as the data storage destination volume of the virtual volume, and
a control section, which includes the mapping management section, for processing access requests from the host to the virtual volume based on the mapping information between the virtual volume and the actual volume managed by the mapping management section,
wherein the control section selects at least one of the communications paths for processing of the access requests based on the mapping information,
wherein priority of each of the communications paths is preset,
wherein the control section selects at least one of the usable communications paths based on the priority and uses the communications path,
wherein the control section further comprises:
a failure detector to detect whether or not a failure has occurred in any of the communications paths,
wherein at least one of the usable communications paths is selected and used when the failure detector detects occurrence of a failure in a communications path in use,
wherein the mapping information managed by the mapping management section stores in corresponding relations at least:
virtual volume identification information for identification of the virtual volume,
actual volume identification information for identification of the actual volume,
information on each path to access the actual volume from the virtual volume using the communications paths,
state information to indicate whether each communications path is in a usable or unusable state, and
priority information including a different priority assigned to each of the communications paths, said priority information, by use of different priorities assigned to the communications paths, indicates the order of use of each of the usable communications paths when replacing a failed communications path, and
wherein upon detection of a failure of one of the communications paths, said control section selects one of the usable communications paths having the highest priority to replace the failed communications path according to the priority information of the mapping information.

2. A storage system as claimed in claim 1, wherein the information on each path is configured by associating first port information for identification of each of the plurality of first ports of the first storage device; second port information for identification of each of the plurality of second ports of the second storage device, and logical unit numbers (LUN) associated with each of the second ports.

3. A storage system as claimed in claim 1, further comprising:
a management device connected to the first storage device to allow Update of all or part of the mapping information with the management device.

4. A storage system as claimed in claim 3, wherein the management device allows all or part of the mapping information to be updated for the each of at least one communications path connected to a preset prescribed connection point.

5. A storage system as claimed in claim 2, further comprising: a management device connected to the first storage device, and wherein all or part of the mapping information can be updated for the each of at least one communications path connected to the first port, the second port, or the actual volume, by this management device.

6. A storage system as claimed in claim 3, wherein the management device can update at least state information included in the mapping information, and when halting the first storage device, the second storage device, or both, in a planned manner, changes the state of the prescribed communications paths relating to this planned halt from usable to unusable, and when the planned halt is complete, changes again the state of the prescribed communications paths to usable.

7. A storage system as claimed in claim 6, wherein when a failure is detected in any of the communications paths and the state of this communications path in which the failure occurred is set to the unusable state, the occurrence of this failure is ignored.

8. A storage system as claimed in claim 7, wherein the priority is fixed even when the management device changes the state of the prescribed communications path to the unusable state.

9. A storage system as claimed in claim 1, wherein the control section processes access requests while switching each communications path in sequence.

10. A storage system as claimed in claim 1, wherein the control section has a first mode for processing access requests using one of the communications paths, and a second mode for processing access requests while switching between communications paths in sequence.

11. A storage system as claimed in claim 10, further comprising:
a third storage device having another actual volume associated with another virtual volume of the first storage device, and connected to the first storage device via a plurality of other communications paths, and
wherein the control section can apply the first mode or second mode in units of storage devices.

12. A method of storage system path control comprising:
a first step of connecting a virtual volume of a first storage device and an actual volume of a second storage device via a plurality of communications paths, and managing, in a control section of the first storage system, mapping information indicating connections between the virtual volume and the actual volume by communications paths, each communications path being in a usable or unusable state;
a second step of processing, in the control section of the first storage system, access requests from the host to the virtual volume using one of the communications paths based on mapping information;
a third step of detecting whether a failure has occurred or not in the communications paths;
a fourth step of selecting at least one usable communications path when a failure occurs in a communications path while in use; and
a fifth step of processing access requests from the host using the selected communications path,
wherein the first storage device comprises:
the control section having a mapping management section which manages the mapping information, said control section conducts data communications between a host and the second storage device,
wherein priority of each of the communications paths is preset,
wherein the control section selects at least one of the usable communications paths based on the priority and uses the communications path,
wherein the control section further comprises a failure detector to detect whether or not a failure has occurred in any of the communications paths,
wherein at least one of the usable communications paths is selected and used when the failure detector detects occurrence of a failure in a communications path in use,
wherein the mapping information managed by the mapping management section stores in corresponding relations at least:
virtual volume identification information for identification of the virtual volume,
actual volume identification information for identification of the actual volume,
information on each path to access the actual volume from the virtual volume using the communications paths,
state information to indicate whether each communications path is in a usable or unusable state, and
priority information including a different priority assigned to each of the communications paths, said priority information, by use of different priorities assigned to the communications paths, indicates the order of use of each of the usable communications paths when replacing a failed communications path, and
wherein upon detection of a failure of one of the communications paths, said control section selects one of the usable communications paths having the highest priority to replace the failed communications path according to the priority information of the mapping information.

13. A method of storage system path control as claimed in claim 12, further comprising:
a sixth step wherein all or part of the mapping information can be updated for each of at least one communications path connected to a preset prescribed connection point.

14. A method of storage system path control as claimed in claim 13, wherein the first storage device further comprises:
a plurality of first ports, and
wherein the second storage device further comprises:
a plurality of second ports, wherein path information is configured by associating the first port information for identifying each of the first ports with the second port information for identifying each of the second ports, and
all or part of the mapping information can be updated for the each of at least one communications path connected to the first port or the second port in the sixth step.

15. A storage system comprising:
a first storage device processing access requests from a host;
a second storage device connected to said first storage device via a plurality of communications paths, each communications path being in a usable or unusable state; and
a management device connected to the first storage device,
wherein the first storage device comprises:
a virtual intermediate memory device connected to the memory area of the memory device of the second storage device via the communications paths,
a virtual volume provided in the memory area of the virtual intermediate memory device,
a control section having a mapping management section which manages a mapping table, said control section conducts data communications between the host and the second storage device, and
a memory section used by the communications control section,
wherein said mapping table is stored in the memory section, for mapping memory devices of the second storage device onto the virtual intermediate memory device,
wherein the control section executes:
a step of using one of the communications paths for processing access requests from the host to the virtual volume based on the mapping table,
a step of detecting whether a failure has occurred or not in each of the communications paths, a step of selecting at least one usable communications path when a failure occurs in a communications path in use, and a step of processing access requests from the host using the selected communications path, wherein the management device has a configuration management unit which updates all or part of the mapping table for the each of at least one communications path connected to a preset prescribed connection point, wherein priority of each of the communications path is preset, wherein the control section selects at least one usable communications path based on the priority and uses the communications path, wherein the control section further comprises a failure detector to detect whether or not a failure has occurred in any of the communications paths, wherein at least one of the usable communications paths is selected and used when the failure detector detects occurrence of a failure in a communications path in use, wherein the mapping table managed by the mapping management section stores in corresponding relations at least:

virtual volume identification information for identification of the virtual volume, actual volume identification information for identification of the actual volume, information on each path to access the actual volume from the virtual volume using the communications paths, state information to indicate whether each communications path is in a usable or unusable state, and priority information including a different priority assigned to each of the communications paths, said priority information, by use of different priorities assigned to the communications paths, indicates the order of use of each of the usable communications paths when replacing a failed communications path, and wherein upon detection of a failure of one of the communications paths, said control section selects one of the usable communications paths having the highest priority to replace the failed communications path according to the priority information of the mapping information.

* * * * *